(12) United States Patent
Tobita

(10) Patent No.: US 7,187,373 B2
(45) Date of Patent: Mar. 6, 2007

(54) DISPLAY APPARATUS

(75) Inventor: Youichi Tobita, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 316 days.

(21) Appl. No.: 10/492,046

(22) PCT Filed: Oct. 11, 2002

(86) PCT No.: PCT/JP02/10633

§ 371 (c)(1),
(2), (4) Date: Apr. 7, 2004

(87) PCT Pub. No.: WO2004/034368

PCT Pub. Date: Apr. 22, 2004

(65) Prior Publication Data

US 2004/0252116 A1 Dec. 16, 2004

(51) Int. Cl.
*G09G 5/00* (2006.01)
(52) U.S. Cl. .............. 345/211; 345/87; 345/208; 345/212; 345/213; 345/98; 345/100
(58) Field of Classification Search ........ 345/211–213, 345/98, 208, 100, 87
See application file for complete search history.

(56) References Cited

U.S. PATENT DOCUMENTS

| | | | | |
|---|---|---|---|---|
| 5,440,272 A | * | 8/1995 | Orisaka et al. ............. 330/253 |
| 5,459,483 A | * | 10/1995 | Edwards ...................... 345/98 |
| 5,627,557 A | * | 5/1997 | Yamaguchi et al. .......... 345/90 |
| 5,739,803 A | * | 4/1998 | Neugebauer ................. 345/98 |
| 5,798,747 A | * | 8/1998 | Moraveji ..................... 345/98 |
| 5,822,264 A | * | 10/1998 | Tomishima et al. ......... 365/222 |
| 6,064,362 A | * | 5/2000 | Brownlow et al. ........... 345/98 |
| 6,590,552 B1 | * | 7/2003 | Yokoyama et al. .......... 345/92 |
| 6,756,962 B1 | * | 6/2004 | Akimoto et al. ............. 345/98 |
| 6,784,865 B2 | * | 8/2004 | Akimoto et al. ............. 345/98 |

FOREIGN PATENT DOCUMENTS

| | | |
|---|---|---|
| JP | 56-120220 A | 9/1981 |
| JP | 59-154808 A | 9/1984 |
| JP | 61-69283 A | 4/1986 |

(Continued)

*Primary Examiner*—Amr A. Awad
*Assistant Examiner*—Sameer Gokhale
(74) *Attorney, Agent, or Firm*—McDermott Will & Emery LLP

(57) ABSTRACT

Amplifier circuits (AMPi, AMPj) are provided corresponding to data lines (DLi, DLj) arranged corresponding to columns of display pixels (PX). In the amplifier circuit, a non-inversion input of a differential amplifier circuit (32) is connected to the corresponding data line, and an inversion input node (N2) is connected to a capacitance element (34). Before pixel data of a displaying pixel element is read onto the data line, the non-inversion input of the differential amplifier circuit is precharged to a predetermined voltage level, and an output node of the differential amplifier circuit is coupled to the inversion input node (N2). The differential amplifier circuit operates as a voltage follower, and the capacitance element stores a comparison reference voltage including information corresponding to an offset of the differential amplifier circuit. Thereafter, data of the displaying pixel element is read onto the data line, and is amplified by the amplifier circuit so that the pixel data can be accurately amplified while canceling the offset of the differential amplifier circuit.

13 Claims, 16 Drawing Sheets

FOREIGN PATENT DOCUMENTS

| | | |
|---|---|---|
| JP | 61-74481 A | 4/1986 |
| JP | 4-56888 A | 2/1992 |
| JP | 4-75389 U | 7/1992 |
| JP | 4-291393 A | 10/1992 |
| JP | 6-67151 A | 3/1994 |
| JP | 7-160226 A | 6/1995 |
| JP | 7-181446 A | 7/1995 |
| JP | 9-320291 A | 12/1997 |
| JP | 11-330874 A | 11/1999 |
| JP | 2000-356974 A | 12/2000 |
| JP | 2001-292041 A | 10/2001 |
| JP | 2001-298333 A | 10/2001 |
| JP | 2002-23705 A | 1/2002 |
| JP | 2002-290172 A | 10/2002 |

* cited by examiner

F I G. 1 4
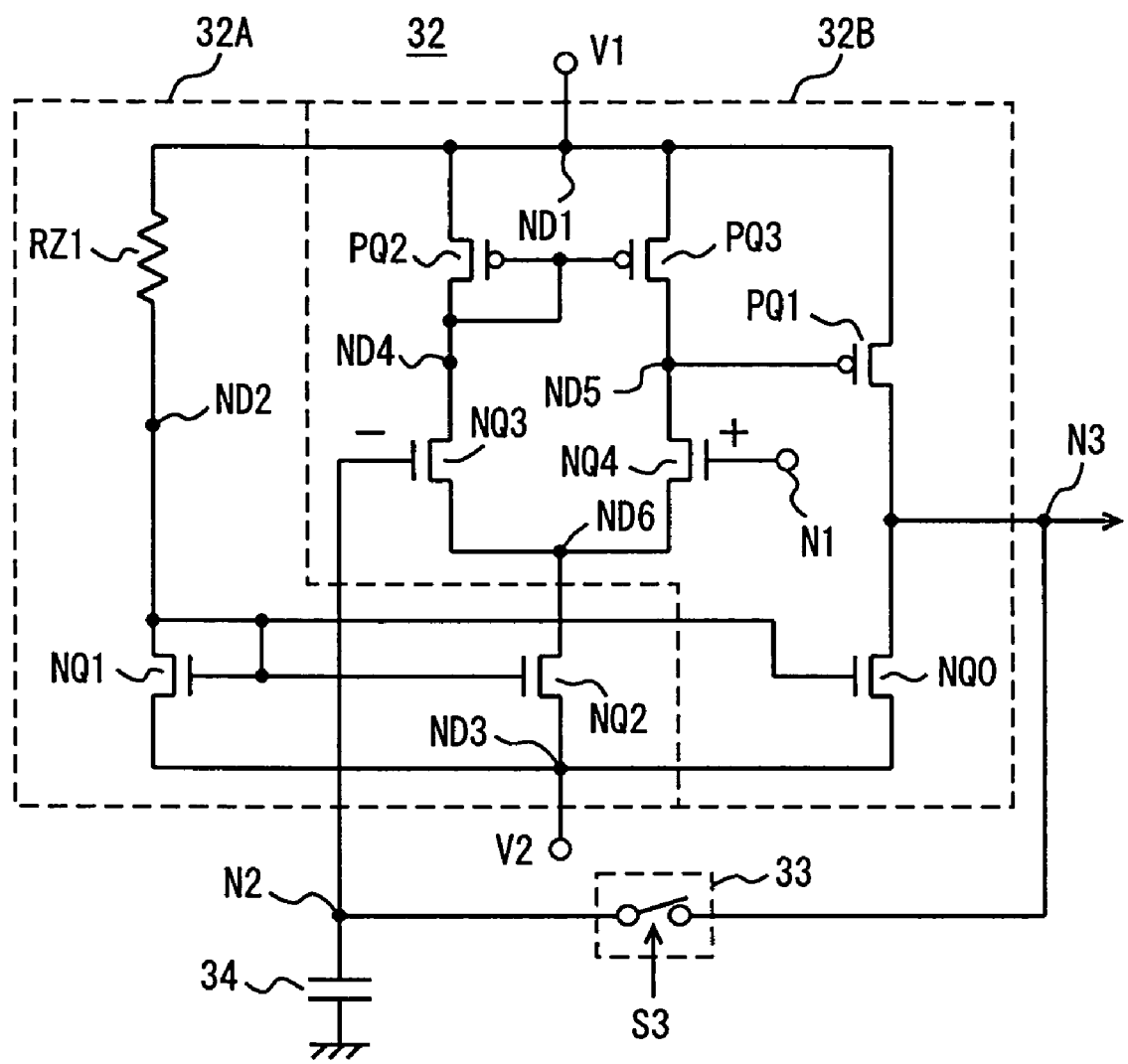

DISPLAY APPARATUS

This application is a 371 of PCT/JP02/10633 Oct. 11, 2002

TECHNICAL FIELD

The present invention relates to a display device for displaying images, and particularly to a display device that drives displaying pixel elements arranged corresponding to pixels by a voltage held by a capacitance.

BACKGROUND ART

LCDs (Liquid Crystal Displays) have been known as one type of display devices. In particular, a liquid crystal display of a thin film transistor driven type (TFT-LCDs), which uses Thin Film Transistors (TFTs) for selecting displaying pixel elements, have been known as one type of LCDs. In the thin film transistor, an amorphous silicon (a-Si) semiconductor thin film or a polycrystalline silicon (p-Si) semiconductor thin film is used as a base material (active layer), and a channel portion and source/drain portions are formed in the active layer.

In a liquid crystal panel of an active matrix type, TFTs serving as switches for image signals are provided for the displaying pixel elements, and through switching operations of these TFTs, drive voltages of the displaying pixel elements are held. Thus, the active matrix type liquid crystal panel are excellent in image quality such as contrast, and response speeds, and therefore are widely used as monitors for a personal computer of portable type and desktop type as well as a projection monitor for displaying still and motion pictures.

In each of pixels of the display device of the active matrix type, a data-holding capacitance element (capacitance element for holding data) holds an image signal applied via the TFT. The displaying pixel element is driven in accordance with the voltage held by the capacitance element.

In the display device, displaying pixels are arranged in rows and columns, and gate lines (scanning lines) are arranged corresponding to the respective rows of the pixels. By sequentially driving the scanning lines to the selected state, the TFTs connected to a selected gate line are turned on so that the image signals are transferred to and held in the corresponding data-holding capacitance elements. As a sequence of driving the gate lines (scanning lines), there are an interlace system of sequentially driving alternate scanning lines to the selected state and a non-interlace system of sequentially driving the successive gate lines to the selected state. In any of these driving systems, for each pixel, there is required a time period in which all the gate lines (scanning lines) are once driven to the selected state after an image signal is once written before a next image signal is written into. An entire of the gate lines (scanning lines) forms one frame. Therefore, each displaying pixel element is required to hold the received image signal by the data-holding capacitance element for duration of one frame period. Usually, one frame cycle (frame frequency) is provided by 60 hertz (Hz). Therefore, rewriting of the holding voltage is performed in each unit pixel element for each one-frame period PF ($=\frac{1}{60}$ second). During this frame period of time, the voltage on a pixel electrode node (voltage holding node) lowers only slightly, so that a change in reflectance (luminance) of the liquid crystal element of the pixel is small, and flicker, reduction in contrast and reduction in display quality are sufficiently suppressed.

In the liquid crystal display device, the current is mainly consumed for charging and discharging capacitances at crossings between scanning lines and data signal lines as well as capacitances of liquid crystal between the interconnection lines (scanning lines and data signal lines) and counter electrodes formed on a whole surface of the opposing substrate. A vertical scanning circuit driving the scanning lines to the selected state operates at a frequency equal to (frame frequency)×(number of scanning lines). Also, a horizontal scanning circuit writing image signal data onto data signal lines operates at a frequency equal to (frame frequency)×(number of scanning lines)×(number of data signal lines). Accordingly, charging and discharging of the inter-line capacitances as well as the capacitances between the interconnecting lines and the counter electrodes are performed at the operation frequencies of these vertical scanning circuit and the horizontal scanning circuit so that power consumption is increased.

For reducing the power consumption, it may be effective to lower the operation frequency, or to perform intermittently the vertical scanning and horizontal scanning. However, if the operation frequencies of the horizontal and vertical scanning circuits are lowered, a data rewriting period increases, and the voltage lowering at the pixel electrode node (voltage holding node) due to a leakage current significantly becomes large so that a reflectance (luminance) of the displaying pixel element accordingly changes significantly. Therefore, the voltage lowering of the pixel electrode node is observed as a flicker on a display screen, which degrades the display image quality. In addition, an average voltage applied to the liquid crystal element lowers so that good contrast cannot be achieved. Further, a display response speed lowers due to slow rewriting. These factors result in degraded display quality.

Japanese Patent Laying-Open No. 2000-356974 discloses an arrangement for preventing the voltage lowering due to the leakage current at the pixel electrode nodes of the display pixels, in which cross coupled type sense amplifiers formed of MOS transistors (insulated-gate field-effect transistors) are provided corresponding to the respective data lines to write inverted output signals of the output signals of the sense amplifiers into original displaying pixel elements.

In this prior art, when only holding of data is to be performed, the gate lines are sequentially selected to read pixel electrode signals of display pixels into the sense amplifiers, and inverted data of the sense amplifiers are re-stored on electrode nodes of original pixel elements. In the device in which the displaying pixel elements are formed of liquid crystal elements, storage of inverted image signals is performed for holding the image signals by application of AC voltages to the liquid crystal layers.

This prior art intends to reduce the power dissipation by restoring the held voltages of the respective pixel internally to eliminate the necessity for writing data from an external memory to restore (refresh) the accumulated voltages of the displaying pixel elements.

In the display device, for MOS transistors (insulated-gate field-effect transistors), generally low-temperature polycrystalline silicon TFTs are employed for ensuring reliability of a glass substrate or an insulating resin substrate for forming pixels. For the low-temperature polycrystalline silicon TFTs, impurity diffusion and other processes are performed through low-temperature processing. As compared with bulk type MOS transistors formed on a surface of a semiconductor substrate region, therefore, impurity diffusion is not sufficient, and a film quality of the polycrystalline silicon is low either. Further, the gate insulating film is not heatprocessed or annealed at a sufficiently high temperature so that the film quality thereof is low. In the case of the TFT, a channel region is formed of a semiconductor layer formed on a glass substrate or an insulating resin substrate, and implantation of impurity ions for controlling a threshold voltage is not performed. Further, no bias voltage is applied to the substrate region.

For these factors, variations in threshold voltage of TFTs in display devices are larger than in bulk type MOS transistors. In the structure employing sense amplifier circuits for restoring (refreshing) the held voltage of the pixels, the sense amplifiers are arranged corresponding to the display pixel matrix, and therefore, it is required to use low-temperature TFTs for the components of the sense amplifier circuits. Such sense amplifier circuits accompany the problem that variations in threshold voltage of the TFTs are large and therefore accurate sensing operation cannot be achieved. Specifically, such sense amplifier circuit is formed of cross-coupled TFTs, and input signals undergo offset when the cross-coupled TFTs have different threshold voltages, so that the sense amplifier circuit cannot accurately amplify the data.

In particular, the held voltage in the pixel is merely held by a data-holding capacitance element in the pixel element, and a read voltage to the sense amplifier circuit is small. Therefore, when the input signals undergo the offset due to large variation in threshold voltages as described above, the sense amplifier circuit cannot accurately amplify the pixel voltage read from the pixel element, and the held voltage of the pixel cannot be refreshed.

Japanese Patent Laying-Open Nos. 20001-292041 and H9-320291 disclose the structures for reducing an offset in an operational amplifier of a sample/hold circuit arranged at an output of a horizontal drive circuit driving data lines in image display devices. These prior arts disclose the arrangements for reducing an adverse influence by the offset of the operational amplifier to incoming image signal, in which an output signal of the operational amplifier is fed back to bias a comparison reference voltage to cancel the offset of the operational amplifier. In these prior arts, however, consideration is given only to a configuration of a data line drive circuit for writing data into pixels in accordance with image data, and no consideration is given to such a problem of the lowering of held voltages in the pixels due to leakage current.

In addition, a test must be performed for determining whether each pixel can accurately perform a display operation after completion of the manufacturing process. In testing, test pixel data is written into each pixel, and then the pixel data thus written are read externally for comparison with the test data. In this test, it is therefore necessary to amplify accurately a minute voltage read from the pixel and to read the amplified voltage externally. For this, a tester is required to detect the minute pixel voltage, and thus becomes expensive.

DISCLOSURE OF THE INVENTION

An object of the invention is to provide a display device, which can accurately hold a pixel data voltage.

Another object of the invention is to provide a display device, which can easily perform a test of pixels with an inexpensive tester.

A display device according to the invention includes a plurality of displaying pixel elements arranged in rows and columns; a plurality of gate lines, arranged corresponding to the respective display pixel rows, each connected to the displaying pixel elements in a corresponding row for selecting the displaying pixels in the corresponding row when selected; a plurality of data lines, arranged corresponding to the respective display pixel columns, each connected to the displaying pixel elements in a corresponding column for transferring pixel data to the displaying pixel elements in the corresponding column; and a plurality of amplifier circuits, arranged corresponding to the respective pixel columns, each amplifying the data on the data line in a corresponding column when activated. Each amplifier circuit includes a capacitance element, a differential amplifier circuit having a first input coupled to the corresponding data line and a second input connected to the capacitance element for differentially amplifying signals on the first and second input signals when activated, a first switching element coupling the first input to a reference power supply supplying a predetermined voltage in response to an operation mode instructing signal, and a second switching element coupling an output of the differential amplifier circuit to the capacitance element in response to the operation mode instructing signal.

The amplifier circuit is arranged for each data line. In the amplifier circuit, the first input of the differential amplifier circuit is coupled to the predetermined power supply, and the second input is coupled to the capacitance receiving the output signal. Thereby, the capacitance element stores an offset voltage of the reference voltage. When a pixel is selected and the pixel data is transferred to the differential amplifier circuit, the pixel data can be differentially amplified while canceling the offset in the differential amplifier circuit. Therefore, even when large variations occur in threshold voltage of TFTs of the differential amplifier circuit, the image data can be accurately restored without an influence of the offset due to such variations in threshold voltage.

By writing the output signal of the differential amplifier circuit into the original pixel, the pixel data can be refreshed (restored). By reading externally the output signal of the differential amplifier circuit, a data signal of a large amplitude can be read externally, and it is not necessary to externally amplify pixel data of a small amplitude. Thus, a structure of a tester can be simplified, and the display device can be easily tested with an inexpensive tester.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 14 shows another structure of the differential amplifier circuit shown in FIG. 3.

BEST MODE FOR CARRYING OUT THE INVENTION

[First Embodiment]

Figure 1:
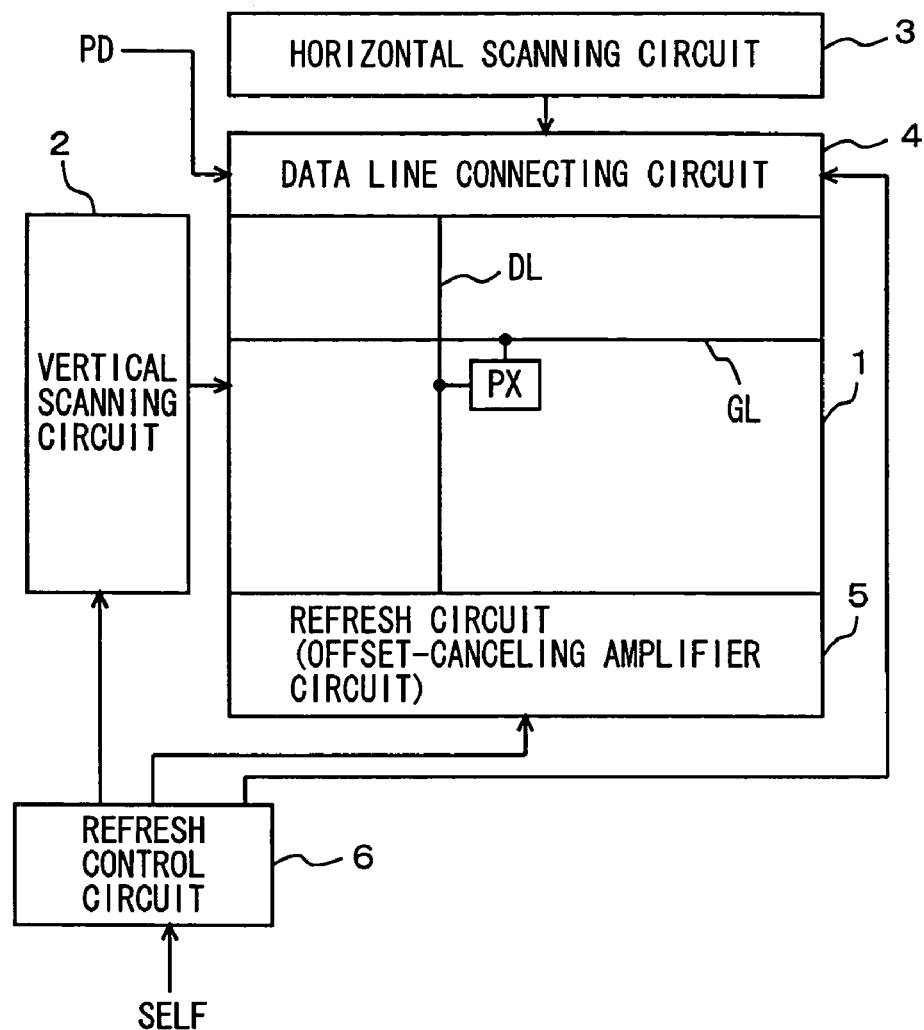
FIG. 1 schematically shows a whole structure of a display device according to the invention.

FIG. 1 schematically shows a whole structure of an image display device according to a first embodiment of the invention. In FIG. 1, an image display device includes a display pixel matrix 1 including a plurality of pixel elements PX arranged in rows and columns, a vertical scanning circuit 2 sequentially selecting the rows in display pixel matrix 1 in accordance with a vertical scan signal (not shown), a horizontal scanning circuit 3 for producing a signal to select a column in display pixel matrix 1 in accordance with a horizontal clock signal (not shown), a data line connecting circuit 4 for sequentially transmitting image data PD to the columns in display pixel matrix 1 in accordance with the select signal received from horizontal scanning circuit 3, a refresh circuit 5 for refreshing a held voltage of each display pixel in display pixel matrix 1 when made active, and a refresh control circuit 6 for controlling operations of vertical scanning circuit 2, data line connecting circuit 4 and refresh circuit 5 in accordance with a refresh mode instructing signal SELF.

In display pixel matrix 1, gate lines GL are arranged corresponding to the respective rows of pixel elements PX, and data lines DL are arranged corresponding to the respective columns of pixel elements PX. Gate line GL is connected to pixel elements PX on a row, and data line DL is connected to pixel elements PX on a column. FIG. 1 representatively shows pixel element PX arranged at a crossing between one gate line GL and one data line DL.

Vertical scanning circuit 2 drives gate line GL to a selected state in a predetermined sequence in both of a normal operation mode for rewriting the held voltages of pixel elements PXs and a refresh mode for restoring the held voltages. The sequence for driving gate lines GL to the selected state by vertical scanning circuit 2 may be any of the non-interlace system of sequentially driving the successive rows to the selected state and the interlace system of driving the alternate rows to the selected state.

Horizontal scanning circuit 3 includes, for example, a horizontal shift register for producing a data line select timing signal through a shift operation in accordance with a horizontal clock signal (not shown), and a buffer circuit for sequentially selecting data lines DLs in accordance with the output signal of the horizontal shift register. Owing to the provision of the buffer circuit in horizontal scanning circuit 3, it is possible to prevent a multi-selection, in which a next data line is driven to the selected state before a data line under selection transits to the non-selected state.

In the normal operation, data line connecting circuit 4 sequentially selects the data lines in accordance with the output signal of horizontal scanning circuit 3, and transmit image data PD transmitted via an image data bus (a common image data line) to the selected corresponding column in display pixel matrix 1. In the refresh mode, data line connecting circuit 4 is kept in cut off state to isolate the image data bus (or data line driver) transmitting image data PD from display pixel matrix 1.

Data line connecting circuit 4 may be configured to takes in image data PD for one row under control of horizontal scanning circuit 3, and then transfers the one row image data concurrently to displaying pixel elements PX in the selected row of display pixel matrix 1. In this configuration, a sample and hold circuit samples the image data, and then transfers the sampled data concurrently.

When a refresh mode instructing signal SELF is active, refresh control circuit 6 activates the refresh circuit 5 to execute the refreshing (restoring) of the held voltage of each displaying pixel element PX in display pixel matrix 1. In the refresh mode, refresh control circuit 5 may produce various clock signals required for the shift operation for vertical scanning circuit 2, or refresh control circuit 6 may produce various clock signals required for the shift operation for vertical scanning circuit 2 in accordance with an externally applied clock signal.

Refresh circuit 5 includes amplifier circuits, provided corresponding to the respective data lines DLs, each formed of TFTs. A circuit for canceling an offset is provided for each amplifier circuit in refresh circuit 5, to cancel the offset due to variation in threshold voltage of TFTs. Data amplified by the amplifier circuit with the offset canceling function in refresh circuit 5 is written into an original pixel element PX to refresh the held voltage of pixel element PX in display pixel matrix 1.

It is not necessary to further read the refresh data (data for refreshing) stored in an external memory for writing into display pixel matrix 1 for the purpose of refreshing, so that power consumption can be reduced. In the refresh circuit 5, the circuit for amplifying the pixel data contains a construction for canceling the offset, and the minute voltage read from a displaying pixel element PX can be accurately amplified and written into the original pixel element PX. Thus, the held voltage can be maintained for a long period of time when no display image is changed, and degradation in image quality of the displayed image can be reliably prevented.

In a test mode, the image data amplified by the amplifier circuit in refresh circuit 5 is externally transmitted. The image data of a large amplitude can be produced and outputted externally, and the displaying pixel elements can be tested with an inexpensive tester directed to LSIs.

Figure 2:
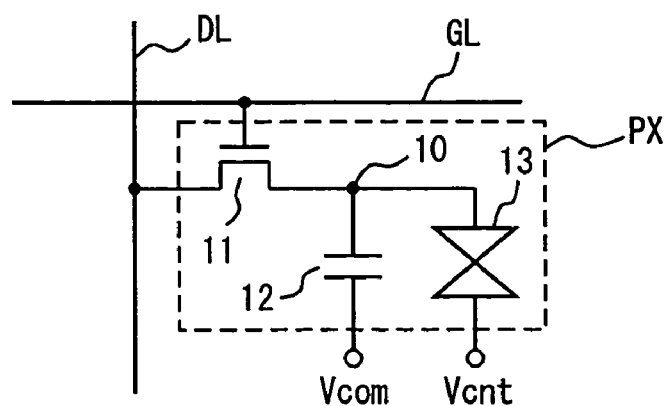
FIG. 2 shows an example of a structure of a displaying pixel element shown in FIG. 1.

FIG. 2 shows an example of a structure of displaying pixel element PX shown in FIG. 1. In FIG. 2, displaying pixel element PX includes an N-channel MOS transistor (TFT) 11 made conductive in accordance with a signal potential on gate line GL, to electrically couples a corresponding data line DL to a pixel electrode node (voltage holding node) 10, a voltage holding capacitance element 12 holding the voltage on voltage holding node 10, and a liquid crystal display element 13 disposed between voltage holding node 10 and a counter electrode.

Voltage holding capacitance element 12 has one electrode node coupled to voltage holding node 10, and receives a common electrode voltage Vcom on the other electrode node. Voltage holding capacitance element 12 accumulates charges corresponding to a difference between common electrode voltage Vcom and a signal voltage applied via data line DL as well as a capacitance value of voltage holding capacitance element 12.

In liquid crystal display element 13, the orientation direction is determined by a voltage difference between the voltage on voltage holding node 10 and a counter electrode voltage Vcnt on the counter electrode, and accordingly the reflectance (luminance) is determined. Counter electrode voltage Vcnt is placed over the whole area of display pixel matrix 1. Common electrode voltage Vcom determines an amount of accumulated charges at voltage holding node 10, and is commonly applied to each pixel element PX in display pixel matrix 1.

Charges held on voltage holding node 10 leak through liquid crystal display element 13, capacitor 12 or TFT 11. The voltage held on the voltage holding node 10 is restored to the original voltage level through the refreshing operation by refresh circuit 5 shown in FIG. 1. Lowering of the voltage due to leakage of charges can be compensated for to maintain the image data accurately for a long period of time.

Usually, gate lines GL are driven between a high voltage and a negative voltage. By driving gate lines GL to the high voltage level, the image signal transmitted onto data line DL can be transmitted to voltage holding node 10 without a loss of a threshold voltage of TFT 11. By maintaining gate line GL at the negative voltage level, TFT 11 is set to a deeply off state, and the leakage current through TFT 11 is suppressed.

Figure 3:
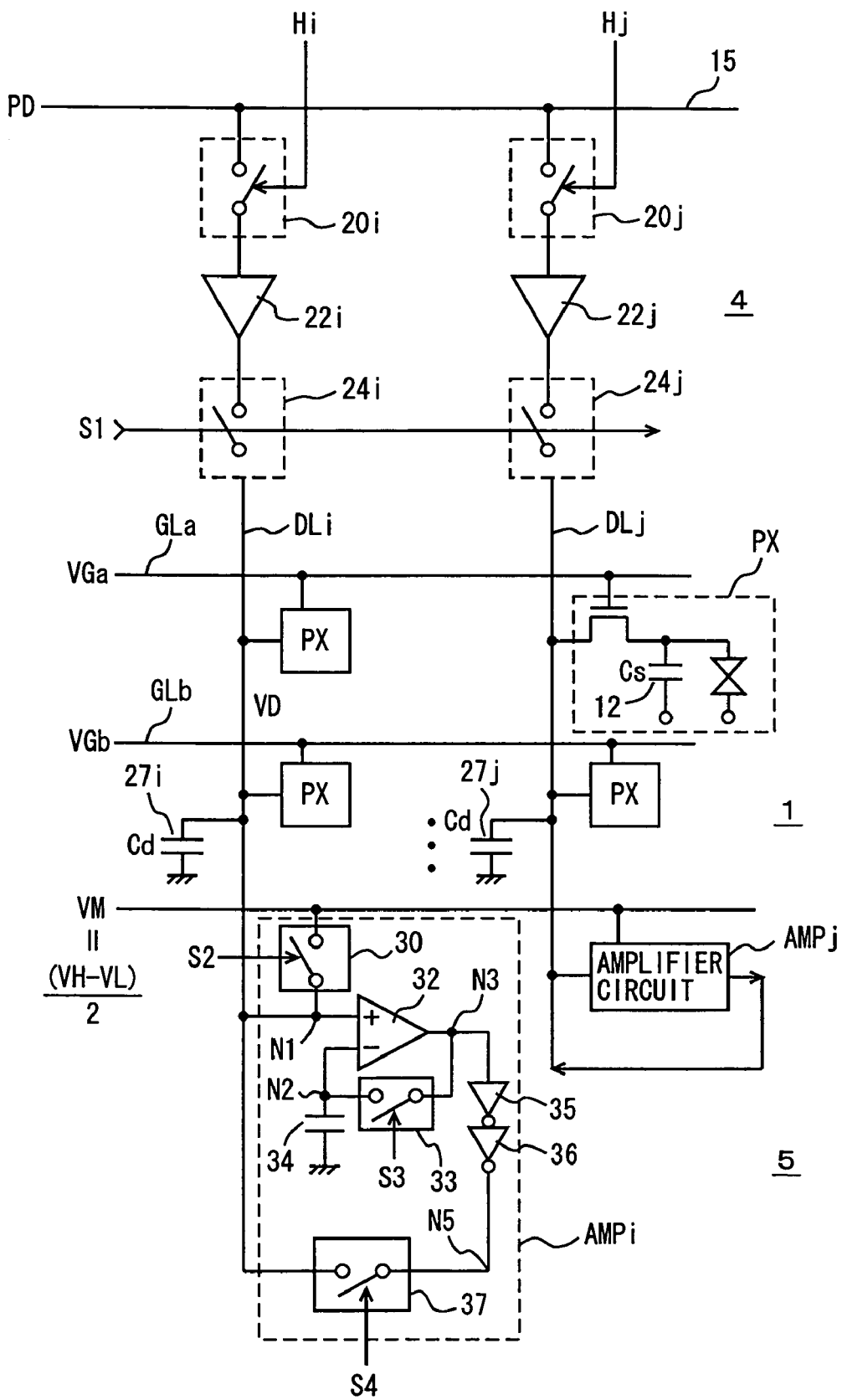
FIG. 3 specifically shows a structure of a main portion of the display device shown in FIG. 1.

FIG. 3 specifically shows structures of data line connecting circuit 4, display pixel matrix 1 and refresh circuit 5 shown in FIG. 1. FIG. 3 representatively shows pixels PX arranged in two rows and two columns in display pixel matrix 1. Each of gate lines GLa and GLb is arranged for pixel elements PX aligned in one row, and each of data lines DLi and DLj is arranged for pixel elements PX aligned in one column. Gate lines GLa and GLb are supplied with gate line drive voltages VGa and VGb from vertical scanning circuit 2 shown in FIG. 1, respectively.

Data line connecting circuit 4 includes data line select gates 20*i* and 20*j*, which are selectively turned conductive in accordance with data line select signals Hi and Hj applied from horizontal scanning circuit 3 shown in FIG. 1, respectively, to transmit image data signal PD applied from a common image data line 15, data line drivers 22*i* and 22*j* provided corresponding data line select gates 20*i* and 20*j*, respectively, and isolation gates 24*i* and 24*j* arranged between outputs of data line drivers 22*i* and 22*j* and data lines DLi and DLj, respectively.

Isolation gates 24*i* and 24*j* selectively turn non-conductive in response to connection control signal S1, to isolate the outputs of data line drivers 22*i* and 22*j* from data lines DLi and DLj, respectively. In the refresh mode, connection control signal S1 is made active to render isolation gates 24*i* and 24*j* non-conductive.

Data line drivers 22*i* and 22*j* each are usually formed of a voltage followers, and produce a signal at a voltage level corresponding to image data signal PD applied onto common data line 15 when corresponding data line select gates 20*i* and 20*j* are conductive.

Refresh circuit 5 includes amplifier circuits AMPi and AMPi provided corresponding to data lines DLi and DLj, respectively. In operation, amplifier circuits AMPi and AMPj differentially amplify the signals on corresponding data lines DLi and DLj based on a comparison reference voltage, and transmit the results of amplification onto corresponding data lines DLi and DLj, respectively. Amplifier circuits AMPi and AMPj have the same structure, and FIG. 3 representatively shows the structure of amplifier circuit AMPi provided for data line DLi.

Amplifier circuit AMPi includes a switching element 30 for transmitting a reference voltage VM to a node N1 in response to a switch control signal S2, a differential amplifier circuit 32 for differentially amplifying voltages on nodes N1 and N2, a switching element 33 for electrically coupling an output node N3 of differential amplifier circuit 32 to node N2 in accordance with switch control signal S2, a capacitance element 34 coupled between node N2 and a ground node, inverter buffers 35 and 36 cascaded in two stages and receiving the output signal of differential amplifier circuit 32, and a switching element 37 for transmitting an output signal of inverter buffer 36 to data line DLi in accordance with a switch control signal S4. These switching elements 30, 33 and 37 are formed of transfer gates or CMOS transmission gates, and are formed of TFTs. Reference voltage VM is substantially set to a value of (VH−VH)/2 intermediate the voltages VH and VL corresponding to H level data and L-level data of image signals written into pixel elements PX, respectively.

Differential amplifier circuit 32 has a non-inversion input connected to node N1 and an inversion input connected to node N2. Therefore, differential amplifier circuit 32 amplifies the voltage on node N1 with a voltage on node N2 being a reference.

Inverter buffers 35 and 36 drive the corresponding data line DLi with a large driving power in accordance with the output signal of differential amplifier circuit 32. A refresh operation of the display device shown in FIG. 3 will now be described with reference to FIG. 4.

In accordance with activation of refresh mode instructing signal SELF, connection control signal S1 attains L level at a time t0, and responsively, isolation gates 24i and 24j are turned non-conductive. In this state, the voltages VD on data lines DLi and DLj are in the floating state, and gate line drive signals VG (VGa and VGb) on gate lines GLa and GLb are at the L level (the level of voltage VGL). In each pixel element PX, therefore, all TFTs (11) are non-conductive, and the internal voltage on the pixel electrode node is held by capacitance element 12.

After connection control signal S1 falls to the L level, switch control signals S2 and S3 are activated at a time t1, and switching elements 30 and 33 turn conductive in amplifier circuits AMPi and AMPj, respectively. Responsively, data lines DLi and DLj indicated in generic by a reference character "DL" hereinafter) are each precharged to a level of intermediate voltage VM via node N1.

In each of amplifier circuits AMPi and AMPj, differential amplifier circuit 32 has the voltage level of output node N3 transmitted to node N2 via switching element 33. Thus, differential amplifier circuit 32 has the output connected to its own inversion input via switching element 33, and operates as a voltage follower.

Figure 10:
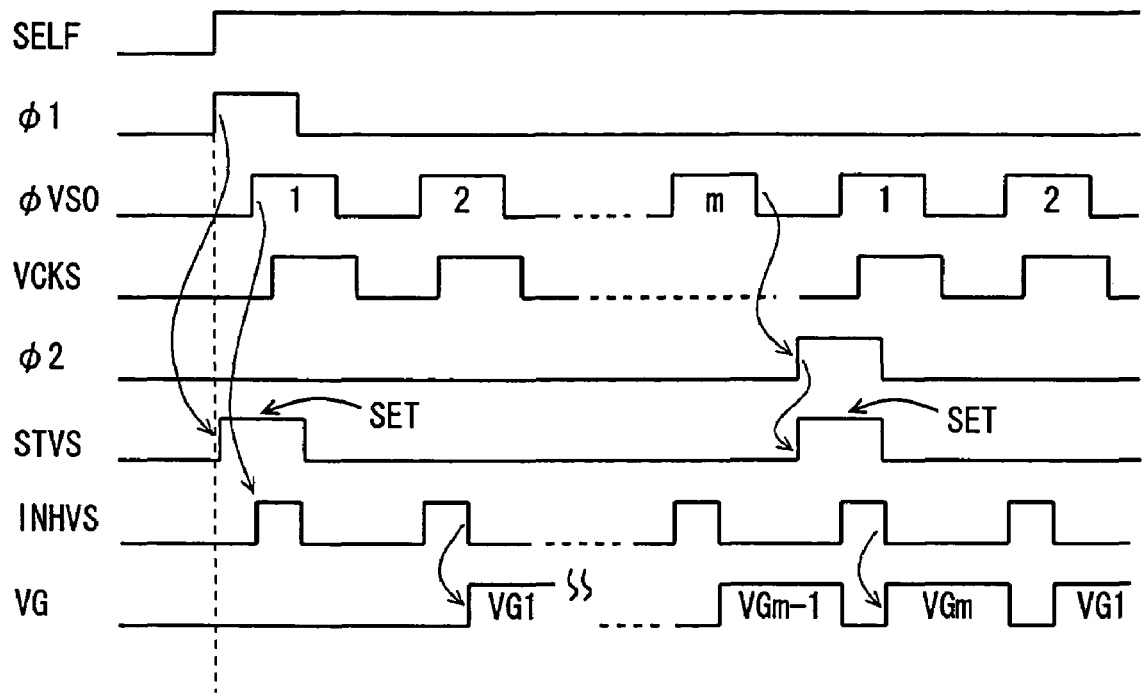
FIG. 10 is a timing chart illustrating an operation of the circuitry shown in FIG. 9.

In differential amplifier circuit 32, an offset VOS is present due to variation in threshold voltage of TFTs of its components. Therefore, differential amplifier circuit 32, of which output signal ideally attains a level of the voltage VM on non-inversion input node N1, actually provides an output voltage of (VM+VOS) due to the offset voltage VOS. There is case in which the offset voltage VOS is a negative voltage. FIG. 10 shows, as an example, a state in which offset voltage VOS is at a positive level, and output node N3 of differential amplifier circuit 32 is at a voltage level higher than intermediate voltage VM. Node N2 is coupled to capacitance element 34, and therefore, capacitance element 34 holds the offset voltage information of differential amplifier circuit 32.

When a predetermined time elapses, both switch control signals S2 and S3 are made inactive at a time t2, and switching elements 30 and 33 turn non-conductive. In this state, the voltage VD on data line DL is held at the level of intermediate voltage VM by parasitic capacitance 27 (generically representing 27i and 27j).

Capacitance element 34 holds the node N2 at the level of voltage of (VM+VOS). The voltage of (VM+VOS) is also maintained on output node N3 of differential amplifier circuit 32. Differential amplifier circuit 32 operates as a comparator for comparing the voltage on node N1, i.e., on data line DL with the voltage on node N2 being a comparison reference voltage. The comparison reference voltage held by capacitance element 34 is set at a voltage of (VM+VOS) containing the offset voltage of differential amplifier circuit 32. Therefore, differential amplifier circuit 32 performs the comparing operation in the state in which the offset is cancelled.

Figure 4:
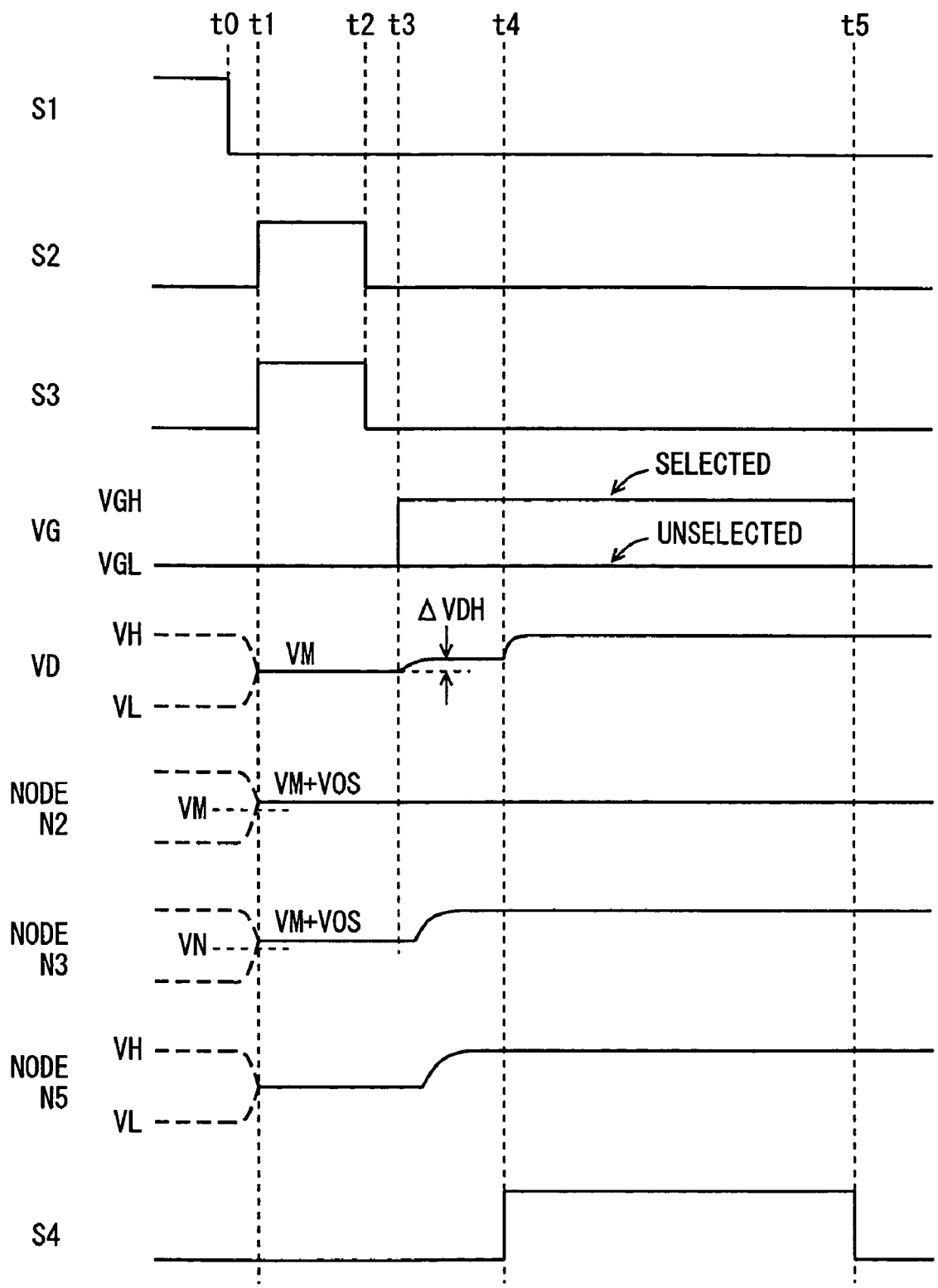
FIG. 4 is a timing chart illustrating an operation of the structure shown in FIG. 3.

At a time t3, gate line GL (GLa or GLb) is driven to the selected state, and gate line drive signal VG (VGa or VGb) on the selected gate line rises to the H level (a voltage VGH level). The unselected gate line is maintained at the L level (voltage VGL level). In pixel element PX connected to selected gate line GL, the TFT turns conductive, and charges held by voltage holding capacitance element 12 are transmitted to data line DL, so that data line voltage VD changes from the precharged voltage VM. FIG. 4 illustrates a case, in which voltage VD on data line DL further rises by a voltage of ΔVDH from intermediate voltage VM set in the precharged state.

For the sake of simplicity, it is assumed that an image signal at H level (voltage VH level) has written onto data line DL, the voltage holding node has no leakage current and no voltage lowering caused, and is maintained at the level of voltage VH. In this case, reading of accumulated charges from the pixel element causes, on data line DL, the voltage change of ΔVDH, which is expressed by the following expression:

$$\Delta VDH = (VH-VM) \cdot Cs/(Cd+Cs),$$

where Cd and Cs represent a capacitance value of parasitic capacitance 27 (27i and 27j) of the data line and a capacitance value of capacitance element 12 of the displaying pixel element, respectively.

Since VM is equal to (VH−VL)/2, the following expression (1) is obtained:

$$\Delta VDH = (VH-VL) \cdot Cs/2 \cdot (Cd+Cs) \quad (1)$$

When the pixel element has stored the data signal at L level of voltage VL, the following expression is satisfied:

$$\Delta VDL = (VL-VM) \cdot Cs/2 \cdot (Cd+Cs) \quad (2)$$
$$= (-VH+3 \cdot VL) \cdot Cs/2 \cdot (Cd+Cs)$$

Assuming that VL is equal to 0 (V), the following expressions (3) and (4) are obtained.

$$\Delta VDH = VH \cdot Cs/2 \cdot (Cd+Cs) \quad (3)$$
$$\Delta VDL = -VH \cdot Cs/2 \cdot (Cd+Cs) \quad (4)$$

Thus, a relationship of (ΔVDH=−ΔVDL) is obtained. A change amount in voltage on the data line becomes the same between reading of the image data signal at the H level and reading of the image data signal at the L level.

Assuming that Cs/Cd=1/20 and VH=5 (V), the following representations are obtained:

$$\Delta VDH = 2.5/20 \cdot 1.1 = 0.119 \text{ (V)}$$
$$\Delta VDL = -\Delta VDH = -0.119 \text{ (V)}$$

Thus, the voltage VD on data line DL ideally changes ±0.119 V about intermediate voltage VM (=2.5 V) in accordance with the data written into the pixel element. Differential amplifier circuit 32 amplifies the voltage change ΔVDH or ΔVDL on the data line, and supplies a resultant signal onto output node N3. Inverter buffers 35 and 36 transform the output signal of differential amplifier circuit 32 into a signal having a larger driving power.

At a time t4, switch control signal S4 becomes active to render switching element 37 conductive. Responsively, data line DL is driven in accordance with a voltage on a node N5 so that the voltage on data line DL is driven up to the H level (voltage VH level). Voltage VD on data line DL is written into original pixel element PX, and is held by voltage holding capacitance element 12 because the corresponding gate line is in the selected state.

In amplifier circuits AMPi and AMPj, the operation power supply voltages of inverters 36 are set to the levels of voltages VH and VL corresponding to the H- and L levels of the pixel data signal, respectively, so that the written image data signal can be accurately restored and rewritten into the original pixel, and the image data can be refreshed.

In the comparing operation of differential amplifier circuit 32 starting at time t3, the voltage of (VM+ΔVDH) or (VM−ΔVDH) is compared with comparison reference voltage (VM+VOS) on node N2 so that the pixel data can be accurately compared and amplified while canceling the offset of differential amplifier circuit 32.

The output signal of differential amplifier circuit 32 has a relatively large amplitude, and even when logical input thresholds of inverters 35 and 36 vary due to variation in threshold voltage of TFTs, a voltage corresponding to the read pixel data can be accurately produced on node N5 in accordance with the output signal of differential amplifier circuit 32, and can be transferred to original data line DL (DLi or DLj).

The foregoing operations are sequentially repeated for each of the gate lines so that refreshing of the pixel data can be effected in a unit of each row of the display pixels.

Figure 5:
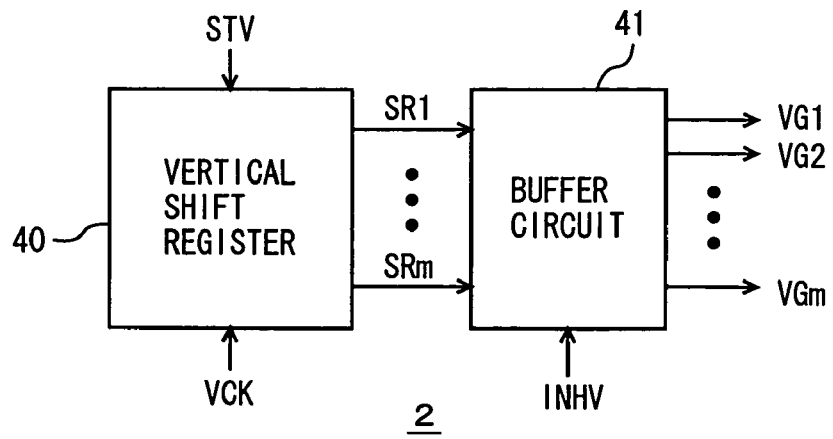
FIG. 5 schematically shows a structure of a vertical scanning circuit shown in FIG. 1.

FIG. 5 shows more specifically the structure of vertical scanning circuit 2 shown in FIG. 1. In FIG. 5, vertical scanning circuit 2 includes a vertical shift register 40 performing the shifting operation in accordance with a vertical scan start signal STV and a vertical scan clock signal VCK, to sequentially drives its outputs SR1–SRm to the selected state, and a buffer circuit 41 for producing data line drive signals VG1–VGm in accordance with multi-selection inhibiting signal INHV and output signals SR1–SRm of vertical shift register 40.

Vertical scan start signal STV is made active when scanning of one frame (or one field) is completed in the display pixel matrix. Vertical shift register 40 has its select output initialized in accordance with activation of vertical scan start signal STV, and resumes the shift operation starting at its initialized position in accordance with vertical scan clock signal VCK.

Figure 6:
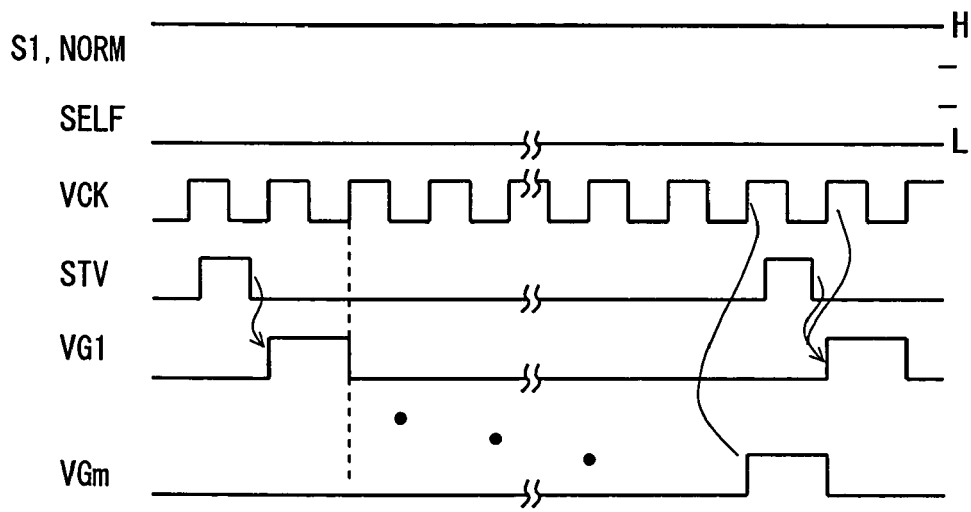
FIG. 6 is a timing chart illustrating an operation of the vertical scanning circuit shown in FIG. 5.

Buffer circuit 41 operates in accordance with multi-selection inhibiting signal INHV to inhibit occurrence of simultaneous selection of two gate drive signals among gate line drive signals VG1–VGm. Specifically, when multi-selection inhibiting signal INHV is at logically high level or at the H level to be active, buffer circuit 41 sets all gate line drive signals VG1–VGm to the unselected state regardless of the state of output signals SR1–SRm of vertical shift register 40. When multi-selection inhibiting signal INHV attains the logical low level or L level, buffer circuit 41 drives the gate line drive signals (vertical scan signals) to the select state in accordance with output signals SR1–SRm of vertical shift register 40. Referring to FIG. 6, writing of the image data in the normal operation mode will now be described briefly.

In the normal operation mode, refresh mode instructing signal SELF is at the L level. In this state, connection control signal S1 and a normal operation mode instructing signal NORM are both active. Normal operation mode instructing signal NORM is an inverted signal of refresh mode instructing signal SELF. In this case, vertical shift register 40 performs the shift operation in accordance with vertical scan start signal STV, multi-selection inhibiting signal INHV and vertical scan clock signal VCK, which in turn are applied from an external controller (not shown).

Specifically, vertical shift register 40 takes in vertical scan start signal STV, performs the shift operation in accordance with a subsequently applied vertical scan clock signal VCK, and drives select signal SR1 for the first row to the selected state. When vertical scan start signal STV rises, gate line drive signal VG1 is driven to the selected state in the next cycle. Thereafter, vertical shift register 40 performs the shift operation in accordance with vertical scan clock signal VCK, and sequentially drives gate line drive signals VG1–VGm. FIG. 6 shows, as an example, the sequence for successively selecting gate line drive signals VG1–VGm in accordance with the non-interlace system. Gate line drive signals VG1–VGm may be driven to the selected state in accordance with the interlace system. In the interlace system, a field formed of the gate lines on even-numbered rows and a field of the gate lines on odd-numbered rows are alternately selected.

While gate line drive signal VG1 is in the selected state, horizontal scanning circuit 3 shown in FIG. 1 performs the shift operation in accordance with the horizontal clock signal (not shown), and an image signal corresponding to image data signal PD is transferred onto each data line. In this normal operation mode, all switch control signals S2, S3 and S4 are inactive, and even when differential amplifier circuit 32 performs the differential amplification, the output of differential amplifier circuit 32 in each of amplifier circuits AMPi and AMPj shown in FIG. 3 is isolated from corresponding data line so that the output of the differential amplifier does not exert an effect on the writing of the image data signal. All refresh circuits 5 may be kept inactive in the normal operation mode.

Figure 7:
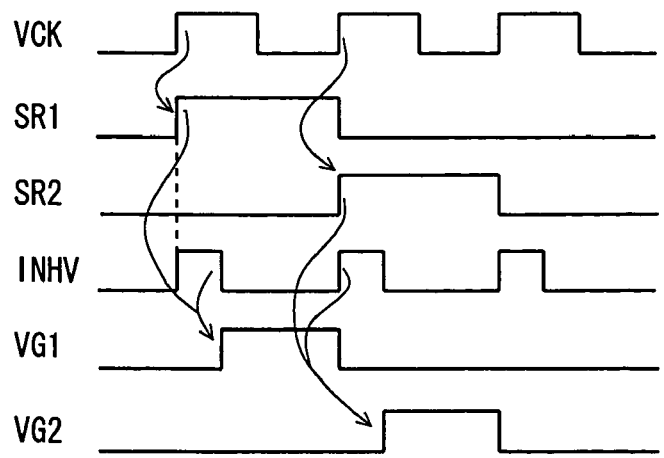
FIG. 7 shows more specifically the operation of the vertical scanning circuit shown in FIG. 5.

FIG. 7 shows more specifically the operations of vertical shift register 40 and buffer circuit 41 in the normal operation mode. As shown in FIG. 7, vertical shift register 40 performs the shift operation in accordance with vertical scan clock signal VCK. Therefore, output signals SR1 and SR2 of vertical shift register 40 are at logically higH level or at the H level during one clock cycle of vertical scan clock signal VCK.

In response to the rising of vertical scan clock signal VCK, multi-selection inhibiting signal INHV is at the H level for a predetermined period, and responsively, all output signals VG1–VGm of buffer circuit 41 are set at the L level. Therefore, while multi-selection inhibiting signal INHV is at the H level, all gate line drive signals VG1–VGm are in the non-selected state.

When multi-selection inhibiting signal INHV falls to the L level, buffer circuit 41 drives gate line drive signals VG1–VGm in accordance with output signals SR1–SRm of vertical shift register 40. Even when output signals SR1 and SR2 of the vertical shift register 40 are both at H level for a certain period when vertical shift register 40 performs the shift operation in response to rising of vertical scan clock signal VCK, multi-selection inhibiting signal INHV is at the H level, and therefore, multi-selection of gate line drive signals VG1 and VG2 applied from buffer circuit 41 does not occur. As a result, the image data can be reliably written into the pixels on the selected row (gate line).

In accordance with horizontal scan signals H1, H2, . . . (see FIG. 2), the image data is successively written into the pixels connected to the selected row in accordance with a point sequential system. Instead of this point sequential system, however, such a writing system can be employed that the image data signals are simultaneously written into the pixels on a selected row. In this system, write timing signals are applied instead of horizontal scan signals H1, H2, . . . shown in FIG. 2, and data line select gates 20 (generically representing 20i and 20j) shown in FIG. 2 are simultaneously made conductive.

Figure 8:
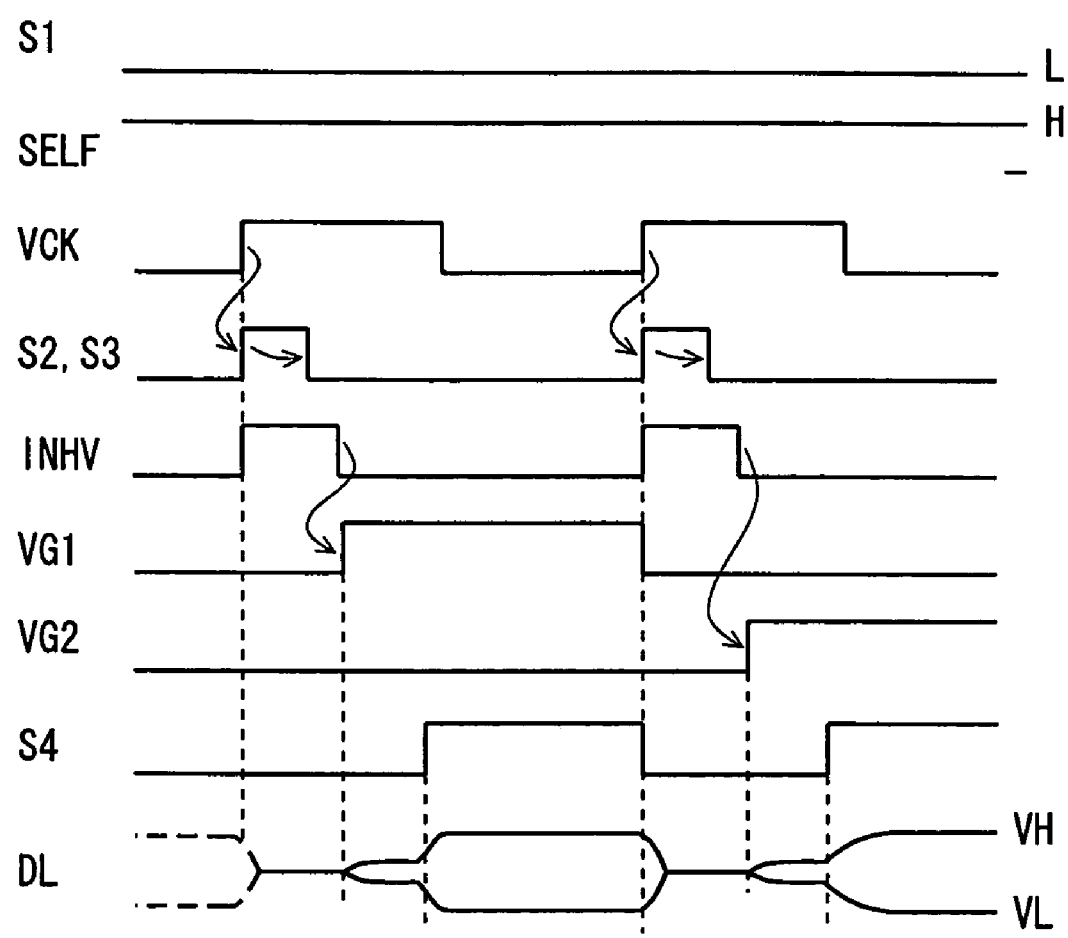
FIG. 8 is a timing chart illustrating operations of structures shown in FIGS. 3 and 5.

FIG. 8 is a timing chart illustrating an operation in refreshing of vertical scanning circuit 2 shown in FIG. 5. FIG. 8 also illustrates switch control signals S2–S4 and potential change on data line DL.

In the refresh mode, refresh mode instructing signal SELF is set to the H level, and connection control signal S1 is set to the L level. In this state, vertical shift register 40 performs the shift operation in accordance with clock signal VCK. In response to the rising of vertical clock signal VCK, switch control signals S2 and S3 become the H level for a predetermined period. During this period of time, multi-selection inhibiting signal INHV is at the H level, and gate line drive signal VG (generically representing VG1 and VG2) is in the inactive state.

After switch control signals S2 and S3 are driven to the inactive state, multi-selection inhibiting signal INHV attains the L level, and responsively, gate line drive signal VG1 rises to the H level. While multi-selection inhibiting signal INHV is at the H level, the operation of precharging data line DL is completed. When gate line drive signal VG1 is driven to the H level, the voltage on data line DL changes in accordance with the voltage of the selected pixel element. The corresponding amplifier circuit amplifies this voltage change. Then, switch control signal S4 attains the H level, and the image data amplified by the amplifier circuit is transmitted to the corresponding data line DL.

When clock signal VCK rises to the H level again, switch control signals S2 and S3 attain H level, gate line drive signal VG1 falls to the L level, and switch control signal S4 attains the L level. Thereby, data line DL is precharged again. Thereafter, vertical scanning circuit 2 performs the shift operation in accordance with vertical scan clock signal VCK during the refresh mode, and sequentially drives the gate lines to the selected state.

By setting an H level period of multi-selection inhibiting signal INHV in the refresh mode to an appropriate time duration, gate line drive signals VG1, VG2, . . . can be reliably driven to the selected state after corresponding data line DL is precharged to the predetermined intermediate voltage level.

Vertical scan clock signal VCK for shifting the gate lines may be externally applied both in the normal operation mode and in the refresh mode. The following description is made of a structure for internally producing vertical scan clock signal VCK in the refresh mode.

Figure 9:
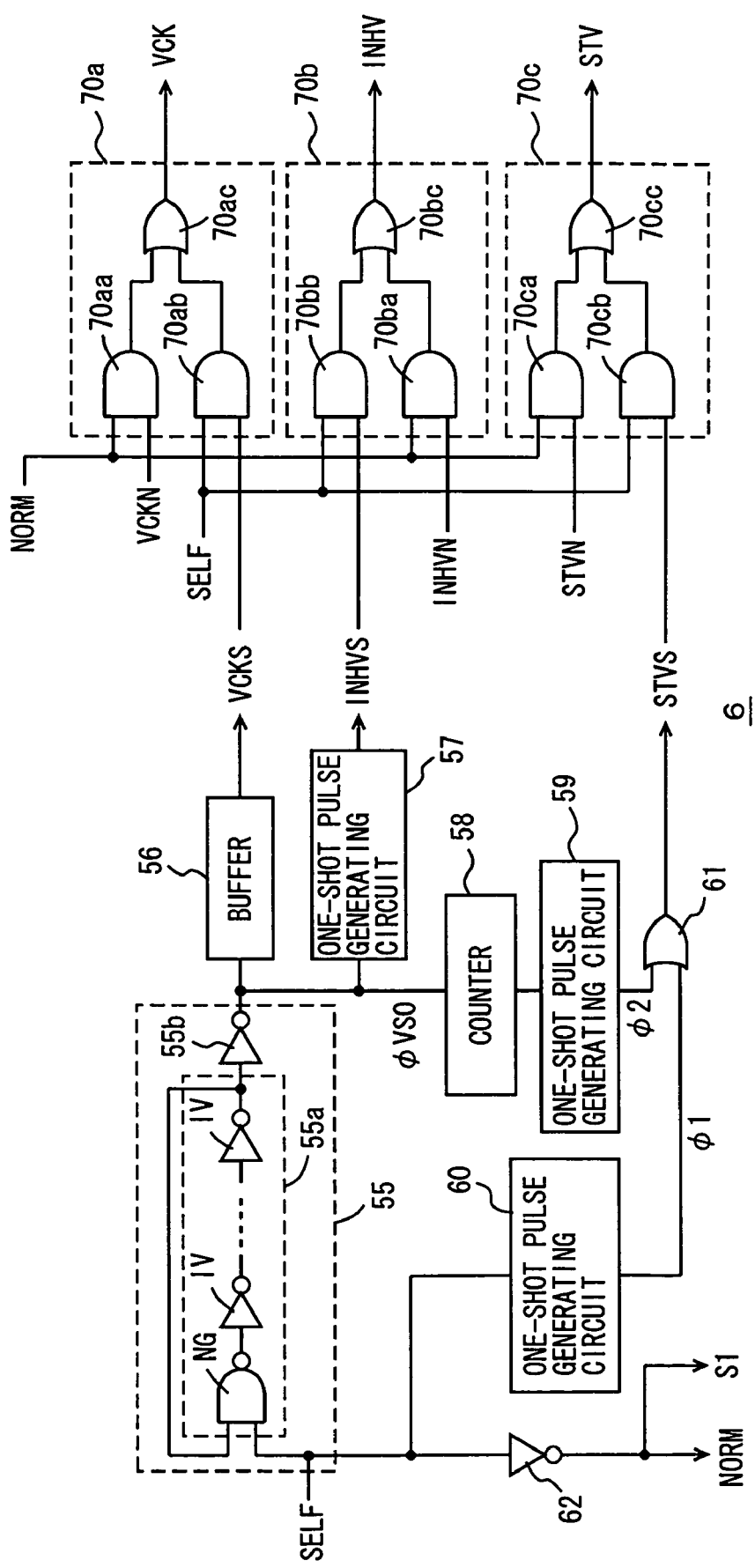
FIG. 9 schematically shows a structure of a portion for generating control signals related to a refresh operation.

FIG. 9 schematically shows a structure of a refresh control circuit 6 shown in FIG. 1. In FIG. 9, refresh control circuit 6 includes an oscillation circuit 55 performing an oscillation at a predetermined cycle in response to activation of refresh mode instructing signal SELF, a buffer circuit 56 for buffering an output signal φVS0 of oscillation circuit 55 to produce a refresh vertical scan clock signal VCKS, an one-shot pulse generating circuit 57 for producing a one-shot pulse signal INHVS in response to rising of output signal φVS0 of oscillation circuit 55, a counter 58 counting output signal φVS0 of oscillation circuit 55, a one-shot pulse generating circuit 59 for generating a one-shot pulse signal φ2 when a count of counter 58 reaches a predetermined value, a one-shot pulse generating circuit 60 for producing a one-shot pulse signal φ1 in response to activation of refresh mode instructing signal SELF, an OR circuit 61 receiving one-shot pulse signals φ1 and φ2 and producing a refresh vertical scan start signal STVS, and an inverter circuit 62 for inverting a refresh mode instructing signal SELF to produce a normal operation mode instructing signal NORM and a connection control signal S1.

Oscillation circuit 55 includes a ring oscillator 55a performing an oscillating operation when refresh mode instructing signal SELF is active, and an inverter 55b for inverting and buffering the output signal of ring oscillator 55a to produce the output signal φVS0. Ring oscillator 55a includes a NAND circuit NG receiving refresh mode instructing signal SELF on a first input, and an even number of stages of cascaded inverters IV receiving the output signal of NAND circuit NG. Inverter IV in the final stage among these even number of stages of inverters applies its output signal to a second input of NAND circuit NG.

Refresh control circuit 6 further includes a select circuit 70a responsive to normal operation mode instructing signal NORM and refresh mode instructing signal SELF, for selecting one of an externally applied vertical scan clock signal VCKN and the refresh vertical scan clock signal VCKS applied from buffer circuit 56 to produce vertical scan clock signal VCK, a select circuit 70b responsive to normal operation mode instructing signal NORM and refresh mode instructing signal SELF, for selecting either one-shot pulse signal INHVS received from one-shot pulse generating circuit 57 or externally applied multi-selection inhibiting signal INHVN to produce multi-selection inhibiting signal INHV, and a select circuit 70c responsive to normal operation mode instructing signal NORM and refresh mode instructing signal SELF, for selecting either an externally applied vertical scan start signal STVN or an output signal STVS of OR circuit 61 to produce vertical scan start signal STV.

Select circuit 70a includes an AND gate 70aa receiving normal operation mode instructing signal NORM and externally applied vertical scan clock signal VCKN, an AND gate 70ab receiving refresh mode instructing signal SELF and the output signal VCKS of buffer circuit 56, and an OR gate 70ac receiving the output signals of AND gates 70aa and 70ab to produce vertical scan clock signal VCK.

Select circuit 70b includes an AND gate 70ab receiving normal operation mode instructing signal NORM and the externally applied multi-selection inhibiting signal INHVN, an AND gate 70bb receiving refresh mode instructing signal SELF and the pulse signal INHVS outputted from one-shot pulse generating circuit 57, and an OR gate 70bc receiving the output signals of AND gates 70ba and 70bb to produce multi-selection inhibiting signal INHV.

Select circuit 70c includes an AND gate 70ca receiving normal operation mode instructing signal NORM and externally applied scan start signal STVN, an AND gate 70cb receiving refresh mode instructing signal SELF and output signal STVS of OR circuit 61, and an OR gate 70cc receiving the output signals of AND gates 70ca and 70cb to produce vertical scan start signal STV.

In the normal operation mode, refresh mode instructing signal SELF is at the L level, and normal operation mode instructing signal NORM is at the H level. Therefore, select circuits 70a, 70b and 70c output the vertical scan clock signal VCK, multi-selection inhibiting signal INHV and vertical scan start signal STV in accordance with the externally applied signals VCKN, INHVN and STVN, respectively. In the refresh mode, refresh mode instructing signal SELF is at the H level, and normal operation mode instructing signal NORM is at the L level. Therefore, select circuits 70a, 70b and 70c produce vertical scan clock signal VCK, multi-selection inhibiting signal INHV and vertical scan start signal STV in accordance with the signals VCKS, INHVS and STVS applied from buffer circuit 56, one-shot pulse generating circuit 57 and OR circuit 61, respectively.

FIG. 10 is a timing chart illustrating an operation of a portion producing the signals related to the refreshing in refresh control circuit 6 shown in FIG. 6. Referring to FIG. 10, the operation of refresh control circuit 6 shown in FIG. 9 will now be described.

When refresh mode instructing signal SELF is at the L level, oscillation circuit 55 is inactive, and output signal φVS0 thereof is fixed at the L level. In refresh control circuit 6, therefore, the output signal VCKS of buffer circuit 56, one-shot pulse signal INHVS of one-shot pulse generating circuit 57 and pulse signal STVS of OR circuit 61 maintain the L level.

Inverter 62 maintains normal operation mode instructing signal NORM at the H level, and connection control signal S1 is also at the H level, so that the image data signals are written into the pixels of the display pixel matrix.

When only the holding of image data is to be performed, refresh mode instructing signal SELF is driven to the H level. When refresh mode instructing signal SELF attains the H level, NAND circuit NG in ring oscillator 55a operates as an inverter, and ring oscillator 55a starts the oscillating operation. Thereby, the output signal φVS0 of oscillation circuit 55 changes with the cycles determined by ring oscillator 55a.

In response to the rising of refresh mode instructing signal SELF, one-shot pulse generating circuit 60 produces one-shot pulse signal φ1 and accordingly, refresh vertical scan start signal STVS turns H-level for a predetermined period. When vertical scan start signal STVS attains H level and refresh vertical scan clock signal VCKS applied from buffer circuit 56 then attains the H level, vertical scan start signal STV produced in accordance with vertical scan start signal STV is set in the vertical shift register. In this state, initialization is merely effected on vertical shift register 40 shown in FIG. 5, and the output signals of the vertical shift register are all at the L level.

In accordance with refresh mode instructing signal SELF, select circuits 70a, 70b and 70c select output signal VCKS of buffer circuit 56, output signal INHVS of one-shot pulse generating circuit 57 and output signal STVS of OR circuit 61, and produces vertical scan clock signal VCK, multi-selection inhibiting signal INHV and vertical scan start signal STV, respectively.

When refresh vertical scan clock signal VCKS applied from buffer circuit 56 rises to the H level again, vertical shift register 40 shown in FIG. 5 performs the shift operation to raise the output of its first stage to the H level. One-shot pulse generating circuit 57 produces refresh multi-selection inhibiting signal INHVS made H-level for a predetermined period in response to the rising of output signal φVS0 of oscillation circuit 55. When refresh multi-selection inhibiting signal INHVS attains the L level, vertical scan signal (gate line drive signal) VG1 produced from the vertical scanning circuit is driven to the H level.

Counter 58 performs the counting of output signal φVS0 of oscillation circuit 55, and produces a count-up signal when it counts the rising of the signal φVS0 m times for the m gate lines of the display pixel matrix. In response to the count-up signal of counter 58, one-shot pulse generating circuit 59 produces the pulse signal φ2 of one-shot, and responsively, vertical scan start signal STVS rises to the H level again. When output signal φVS0 of oscillation circuit 55 rises to the H level subsequently, vertical scan start signal STV produced based on the current refresh vertical scan start signal STVS is set in the vertical shift register. In this state, the vertical shift register drives vertical scan signal VGm for the last scanning line (gate line) in one frame to the H level.

When output signal φVS0 of oscillation circuit 55 rises to the H level again, the vertical shift register raises gate line drive signal VG1 for the first scanning line (gate line) to the H level again in accordance with thus taken-in vertical scan start signal STV.

Therefore, counter 58 produces one-shot pulse signal φ2 each time it counts output signal φVS0 of oscillation circuit 55 m times, and accordingly refresh vertical scan start signal STVS can be produced after completion of scanning of all the vertical scanning lines (gate lines) in the display pixel matrix.

The horizontal scanning is not required in the refreshing particularly. Therefore, refresh control circuit 6 does not produce the signals related to the horizontal scanning. In this state, externally applied signals related to the horizontal scanning are all fixed at the L level in logic, and the horizontal scanning circuit does not operate. This reduces power consumption.

In this refresh mode, one-shot pulse generating circuit 57 is used for producing multi-selection inhibiting signal INHVS. Thus, the pulse width of multi-selection inhibiting signal INHVS can be controlled such that the gate line is driven to the selected state after reliably precharging data line DL to predetermined voltage VM.

Figure 11:
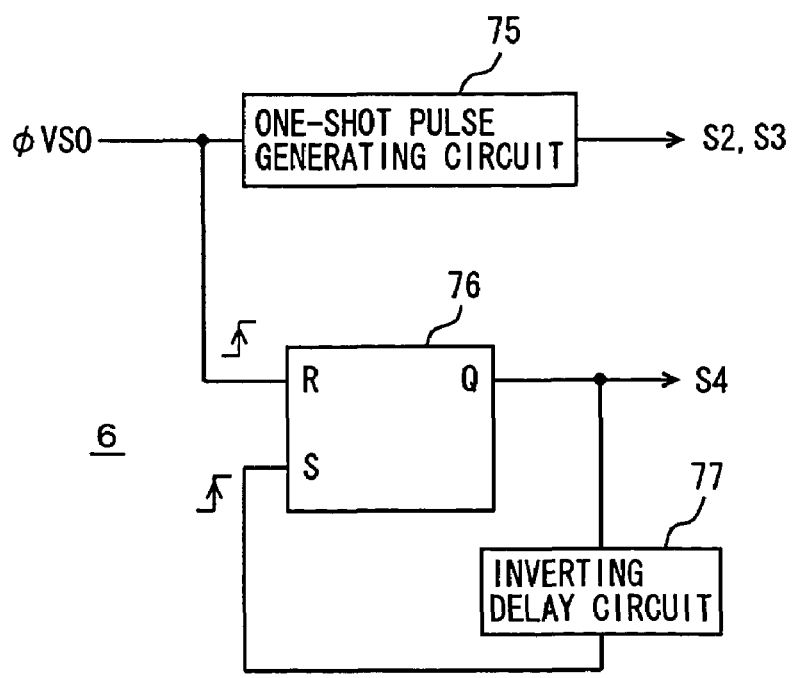
FIG. 11 shows an example of a structure of a portion for generating connection control signals of a refresh control circuit shown in FIG. 1.

FIG. 11 schematically shows a structure of a portion for generating switch control signals S2–S4 in refresh control circuit 6. In FIG. 11, refresh control circuit 6 includes a one-shot pulse generating circuit 75 for producing a one-shot pulse signal in response to rising of output signal φVS0 of oscillation circuit 55 shown in FIG. 9, a set/reset flip-flop 76 reset in response to the rising of output signal φVS0 of oscillation circuit 55, to produce the switch control signal S4 from its output Q, and an inverting delay circuit 77 for inverting and delaying by a predetermined time switch control signal S4. Set/reset flip-flop 76 is set in response to the rising of the output signal of inverting delay circuit 77, to set switch control signal S4 to the H level.

Figure 12:
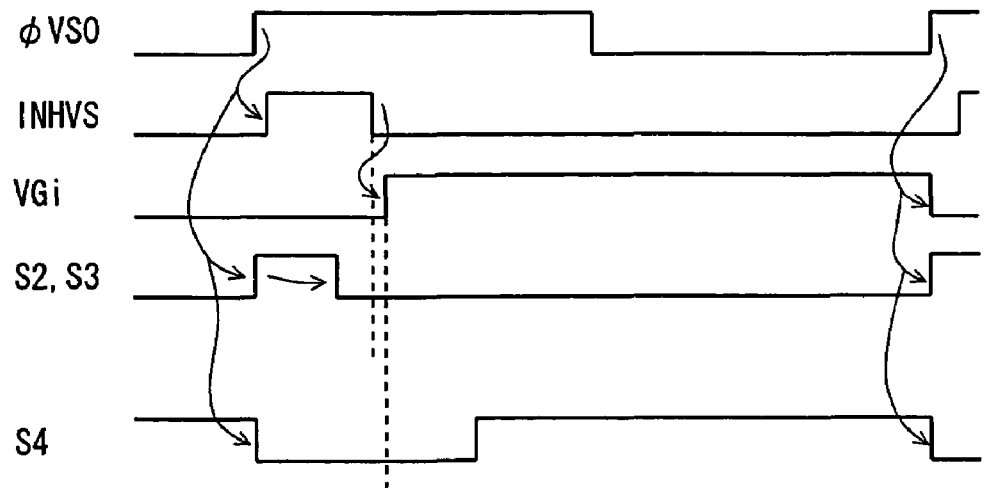
FIG. 12 is a timing chart illustrating an operations of the circuitry shown in FIG. 11.

FIG. 12 is a timing chart illustrating an operation of refresh control circuit 6 shown in FIG. 11. Referring to FIG. 12, the operations of refresh control circuit 6 shown in FIG. 11 will now be described.

When oscillation signal φVS0 rises to the H level, one-shot pulse generating circuit 75 generates a one-shot pulse signal and accordingly switch control signals S2 and S3 attain the H level. The time width, for which switch control signals S2 and S3 are kept active, is made shorter than the H level period of multi-selection inhibiting signal INHVS. It is sufficient to ensure the time duration required for precharging the data lines and setting of the offset in the amplifier circuits.

After switch control signals S2 and S3 are driven to the inactive state, multi-selection inhibiting signal INHVS is driven to the H level, and responsively, gate line drive signal VGi is driven to the H level.

In response to the rising of oscillation signal φVS0, set/reset flip-flop 76 is reset, and switch control signal S4 from its output Q turns L-level to prohibit the transfer of the output signal of the amplifier circuit to the data line.

Switch control signal S4 maintains the inactive state for a predetermined period after gate line drive signal VGi is driven to the active state. When a delay time of inverting delay circuit 77 elapses, the output signal of inverting delay circuit 77 rises to the H level so that set/reset flip-flop 76 is set to drive switch control signal S4 to the H level. At this time, gate line drive signal VGi is already at the H level, and accordingly the pixel data is already read onto the data line and is amplified by the amplifier circuit. Thus, the data line can be driven in accordance with the result of amplification to write the data into the original pixel data.

A series of operations represented in FIG. 12 are repeated in response to the rising of oscillation signal φVS0. By setting the delay time of inverting delay circuit 77 to an appropriate time, after gate line drive signal VGi is driven to the active state and then the amplifier circuit produces amplified pixel data subsequently, amplified pixel data can be accurately written into the original data.

In the case where vertical scan clock signal VCK, vertical scan start signal STV and inhibiting signal INHV are externally applied in the refresh mode, it is not necessary to produce the control signals VCKS, INHVS and STVS related to the refresh as shown in FIG. 4. However, by internally producing multi-selection inhibiting signal INHVS, the gate line drive signal can be accurately driven to the selected state after completion of the data line precharging.

When the horizontal scan clock signal is externally applied even in the refresh mode, refresh mode instructing signal SELF is used to stop the shift operation of the horizontal scanning circuit. This can reduce the current consumption in the refresh operation.

According to the first embodiment of the invention, as described above, each data line is provided with the amplifier circuit, in which the data line is precharged to the predetermined voltage, and the output signal of the differential amplifier circuit is held in the capacitance element. Therefore, the offset due to variation in threshold voltage of the differential amplifier circuit is cancelled out, and the amplifying operation can be performed accurately.

In the refresh operation, since it is not necessary to change the displayed image, it is not required to change the voltage polarity of pixel drive voltage Vcnt on the counter electrode. In this refresh operation, however, liquid crystal display elements PX may be driven in an AC fashion. In this case, if pixel drive voltage Vcnt is changed in polarity after completion of the refreshing of one frame, in the structure shown in FIG. 2, the output signal of inverter buffer 35 is used for writing the inverted signal of the pixel data signal read from the pixel data into the original pixel. Alternatively, if counter electrode drive voltage Vcnt is set to the intermediate voltage level intermediate the voltages VH and VL corresponding to the H- and L- levels of the drive signal, the inverted pixel data signal outputted from the amplifier circuit is merely written into the original pixel.

In addition, each data line may be provided with a switching element, which is placed between the refresh circuit and the display pixel matrix, and is turned conductive in response to the refresh mode instructing signal. In the normal operation mode, the refresh circuit is isolated from the corresponding data line, and thus the load on the data line driver can be reduced.

[Second Embodiment]

Figure 13:
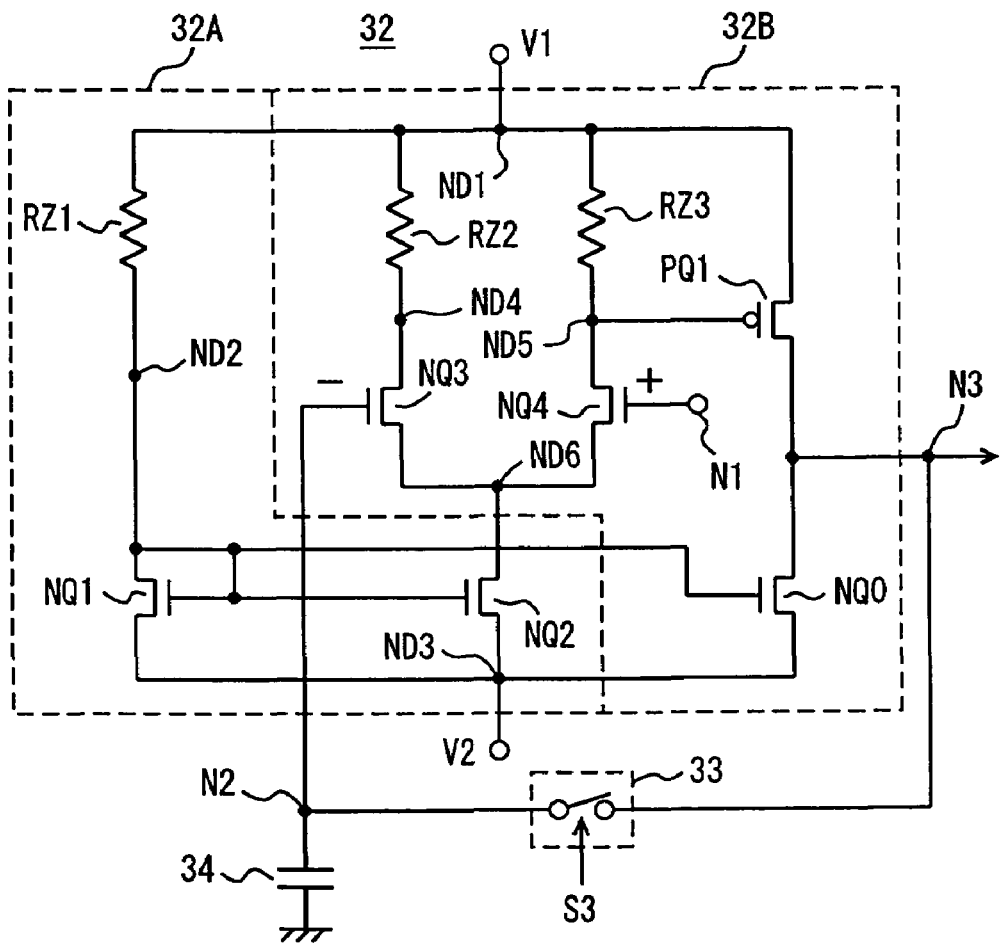
FIG. 13 shows an example of a structure of a differential amplifier circuit shown in FIG. 3.

FIG. 13 specifically shows a structure of differential amplifier circuit 32 shown in FIG. 2. In FIG. 13, differential amplifier circuit 32 includes a constant current section 32A supplying a constant current, and an amplifying section 32B for amplifying the signals on input nodes N1 and N2 to generate a resultant signal onto node N3. Constant current section 32A includes a resistance element RZ1 connected between a power supply node ND1 and a node ND2, an N-channel thin film transistor (TFT) NQ1 connected between nodes ND2 and ND3 and having a gate connected to node ND2, and an N-channel MOS transistor NQ2 forming a current mirror circuit with thin film transistor NQ1. Power supply node ND1 on a higher side receives a voltage V1, and power supply node ND3 on a lower side receives a voltage V2. The voltage levels of these voltages V1 and V2 are merely required for precharge voltage VM to fall within the most sensitive region of differential amplifier circuit 32. For example, voltages V1 and V2 correspond to voltages at the H- and L levels of the image data signal, respectively. Typically, voltage V1 is set to the power supply voltage level, but may be higher than the power supply voltage. Also, voltage V2 is typically set to the ground voltage, but may be a negative voltage.

Amplifying section 32B includes a resistance element RZ2 connected between power supply node ND1 and a node ND4, a resistance element RZ3 connected between power supply node ND1 and a node ND5, an N-channel thin film transistor NQ3 connected between nodes ND4 and ND6 and having a gate connected to node N2, an N-channel thin film transistor NQ4 connected between nodes ND5 and ND6 and having a gate connected to node N1, a P-channel thin film transistor PQ1 connected between power supply node ND1 and output node N3 and having a gate connected to node ND5, and an N-channel thin film transistor NQ0 connected between node N3 and power supply node ND3 and having a gate connected to node NQ1. Nodes N1 and N2 are non-inverted and inverted inputs of differential amplifier circuit 32 shown in FIG. 2. Node N3 is an output node of differential amplifier circuit 32 shown in FIG. 2.

Between nodes N3 and N2, a switching element 33 responsive to switch control signal S3 is arranged. A capacitance element 34 is provided on node N2. Resistance elements RZ1, RZ2 and RZ3 are formed of channel resistances or thin film resistances. Resistance elements RZ2 and RZ3 have the same resistance value. Thin film transistors NQ3 and NQ4 are formed into the same geometry and size, and have the same transistor characteristics.

Description will now be given of the case where switching element 33 is made conductive to electrically connect nodes N3 and N2.

Constant current section 32A causes a flow of current determined by the resistance of resistance element RZ1 and the channel resistance of thin film transistor NQ1. Thin film transistors NQ1 and NQ2 form a current mirror circuit. If thin film transistors NQ1 and NQ2 are the same in size and geometry, thin film transistor NQ2 causes a current flow equal in magnitude to a current flowing through thin film transistor NQ1. Thin film transistor NQ2 functions as a constant current source transistor in a differential amplifier stage of amplifying section 32B. Thin film transistor NQ0 forms a current mirror circuit with thin film transistor NQ1, and drains out a current of a constant magnitude from output node N3.

When node N1 is higher in voltage level than node N2, thin film transistor NQ4 is larger in channel conductance than thin film transistor NQ3, and the voltage level of node ND5 lowers so that the channel conductance of thin film transistor PQ1 increases to supply a current to output node N3. Since node N3 is connected to node N2 via switching element 33, the voltage level of node N2 rises.

When the voltage level of node N2 is higher than the voltage level of node N1, thin film transistor NQ3 is larger in channel conductance than thin film transistor NQ4, and the voltage level of node ND5 is pulled up by resistance element RZ3 so that the channel conductance of thin film transistor PQ1 is reduced. In this case, thin film transistor NQ0 discharges output node N3 to lower the voltage level of output node N3. Therefore, if an offset is not present in the threshold voltages of thin film transistors NQ3 and NQ4, the voltage levels of nodes N1 and N2a become equal to each other through negative feedback operation.

If offset VOS is present in threshold voltages of thin film transistors NQ3 and NQ4, offset VOS affects the changes in channel conductance of thin film transistors NQ3 and NQ4. If the threshold voltage of thin film transistor NQ4 is higher than that of thin film transistor NQ3, node N2 is connected to a voltage level higher by offset VOS. Specifically, assuming that thin film transistors NQ3 and NQ4 are operated simply as a source-coupled logic, one of thin film transistors NQ3 and NQ4 turns conductive, and the other turns non-conductive depending on the voltage levels of nodes N1 and N2, and the output offset corresponding to offset VOS of the threshold voltages thereof occurs on nodes N3 and N2.

Therefore, by rendering switching element 33 conductive to electrically couple the output node and the inversion input node of differential amplifier circuit 32, differential amplifier circuit 32 operates as a voltage follower, to enable storage of the voltage containing the offset of differential amplifier circuit 32, in capacitance element 34.

In the amplifying operation of differential amplifier circuit 32, switching element 33 is made non-conductive. In this state, the voltage containing the offset information and held in capacitance element 34 is compared with the signal applied to non-inversion node N1. Thereby, the channel conductance of thin film transistor PQ1 is adjusted in accordance with the result of comparison, and output node N3 is driven to the voltage level corresponding to the result of comparison.

Therefore, by using thin film transistors of the same size and the same characteristics in the differential stage, and by feeding back the output signal thereof in the precharge operation, the capacitance element can accurately holds the voltage having the offset of the differential amplifier circuit compensated for, and the pixel data signal can be accurately amplified.

FIG. 14 shows another structure of differential amplifier circuit 32 shown in FIG. 2. Differential amplifier circuit 32 shown in FIG. 14 differs in configuration from differential amplifier circuit 32 in FIG. 13 in the following point. In amplifying section 32B shown in FIG. 14, a current mirror stage for amplifying the result of differentiation is provided for thin film transistors NQ3 and NQ4. This current mirror stage includes a P-channel thin film transistor PQ2 connected between power supply node ND1 and node ND4 and having a gate connected to node ND4, and a P-channel thin film transistor PQ3 connected between power supply node ND1 and node ND5 and having a gate connected to node ND4. The structure of differential amplifier circuit 32 shown in FIG. 14 other than the above are the same as that of differential amplifier circuit 32 shown in FIG. 13. The corresponding portions are allotted with the same reference numerals, and description thereof will not be repeated.

Thin film transistors PQ2 and PQ3 have the same geometry and the same size, and cause a current flow of the same magnitude therethrough. Therefore, change in voltage level of node ND4 is reflected on node ND5 via MOS transistors PQ2 and PQ3 so that the amplification rate can be larger than in the use of resistance elements RZ2 and RZ3 shown in FIG. 13.

Minute voltages read from the displaying pixel element can be detected to drive accurately the inverter buffer in the next stage. Thus, the output signal of inverter buffer 36 shown in FIG. 2 can be set to the definite state at a faster timing, and it is possible to reduce the time required for refreshing the voltage held in the displaying pixel element.

Figure 15:
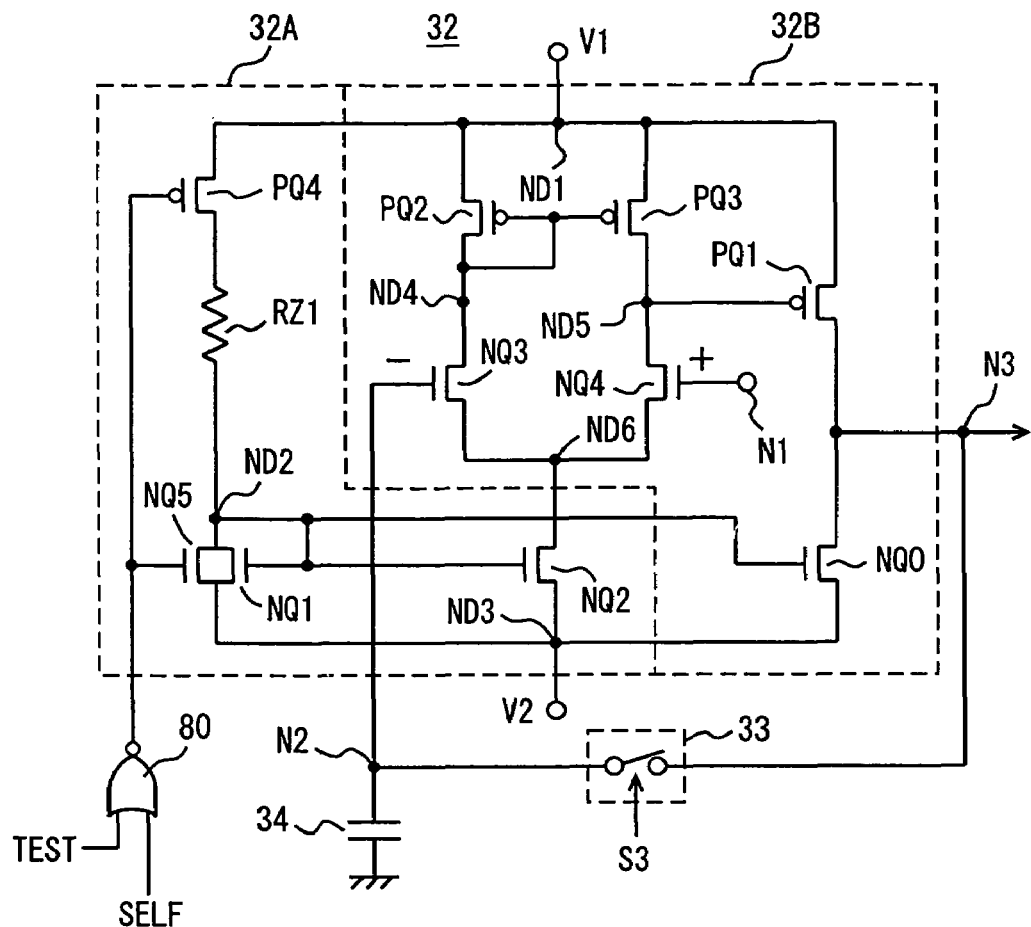
FIG. 15 shows further another structure of the differential amplifier circuit shown in FIG. 3.

FIG. 15 shows still another structure of differential amplifier circuit 32 shown in FIG. 2. Differential amplifier circuit 32 shown in FIG. 15 differs in configuration from differential amplifier circuit 32 shown in FIG. 14 in the following points. In constant current section 32A, a P-channel thin film transistor PQ4 is connected between resistance element RZ1 and power supply node ND1, and an N-channel thin film transistor NQ5 arranged in parallel with N-channel thin film transistor NQ1 is connected between resistance element RZ1 and power supply node ND3. Thin film transistors PQ4 and NQ4 receive on their gates an output signal of a NOR gate 80 receiving a test mode instructing signal TEST and refresh mode instructing signal SELF.

Test mode instructing signal TEST is set to the H level in the test operation mode, which will be described later. Refresh mode instructing signal SELF is set to the H level in the refresh mode. The structure of differential amplifier circuit 32 shown in FIG. 15 other than the above are the same as that of differential amplifier circuit 32 shown in FIG. 14. The corresponding portions are allotted with the same reference numbers, and description thereof will not be repeated.

In the normal operation mode, in which the pixel data is rewritten, test mode instructing signal TEST and refresh mode instructing signal SELF are both at the L level, and the output signal of NOR circuit 80 is set to the H level. In this state, thin film transistor PQ4 is non-conductive, and thin film transistor NQ5 is conductive so that node ND2 is set to the voltage level of the lower side power supply voltage V2. Responsively, thin film transistors NQ1, NQ2 and NQ4 are rendered non-conductive to cut off a path of the operation current in differential amplifier circuit 32.

In the refresh mode or test operation mode, refresh mode instructing signal SELF or test mode instructing signal TEST is set to the H level. In this state, the output signal of NOR gate 80 is set to the L level so that thin film transistor PQ4 is rendered conductive, and thin film transistor NQ5 is rendered non-conductive. Therefore, a path for current flow is formed in constant current section 32A so that a constant current flows through thin film transistors NQ2 and NQ4, and amplifying section 32 enters the operating state.

In differential amplifier circuit 32 shown in FIG. 15, the operation current flows through the differential amplifier circuit only in the test operation mode or the refresh operation mode. In the normal operation mode, the path of the operation current of differential amplifier circuit 32 is cut off so that the current consumption can be reduced in the normal operation mode.

In the structure of differential amplifier circuit 32 shown in FIG. 15, output node N3 is in the floating state in the normal operation mode. For preventing this floating state, a P-channel thin film transistor receiving on its gate the output signal of NOR gate 80 may be connected in parallel with output drive transistor PQ1.

According to the second embodiment of the invention, as described above, the differential amplifier circuit is formed of the constant current section and the amplifying section operating with the current supplied from the constant current section being its operation current, and this amplifying section is formed of the differential amplifying stage and the transistors driving the output node in accordance with the output signal of the differential amplifying stage. Therefore, it is possible to achieve the differential amplifier circuit that performs the amplifying operation with a simple structure and a reduced occupying area.

[Third Embodiment]

Figure 16:
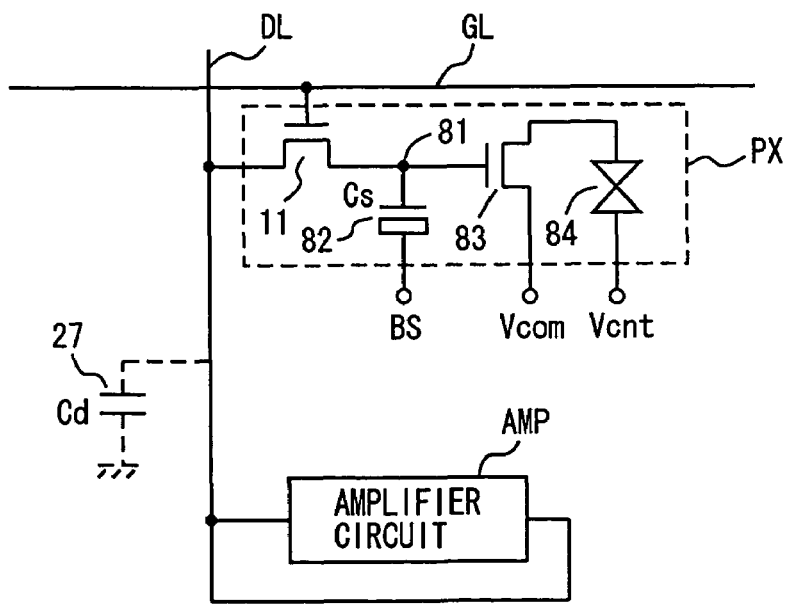
FIG. 16 schematically shows a structure of a major portion of a display device according to a second embodiment of the invention.

FIG. 16 shows a structure of a major portion of a display device according to a third embodiment of the invention. FIG. 16 representatively shows displaying pixel element PX arranged corresponding to a crossing between gate line GL and data line DL. Similarly to the structure shown in FIG. 2, displaying pixel elements PX are arranged in rows and columns, data lines DL are arranged corresponding to the columns of display pixels, respectively, and gate lines GL are arranged corresponding to the rows of display pixels, respectively.

Amplifier circuit AMP is arranged corresponding to data line DL. Amplifier circuit AMP in FIG. 16 has the same structure as the amplifier circuits AMPi and AMPj shown in FIG. 2.

Parasitic capacitance 27 is present on data line DL. Parasitic capacitance 27 has capacitance value Cd.

Displaying pixel element PX includes an N-channel thin film transistor 11 made conductive in response to the signal potential of gate line GL, to electrically couples a pixel electrode node (voltage holding node) 81 to data line DL, a voltage holding capacitance element 82 connected between pixel electrode node (voltage holding node) 81 and a boost node, an N-channel thin film transistor 83 transmitting pixel drive voltage Vcom in accordance with the voltage held on pixel electrode node 81, and a liquid crystal display element 84 connected between a voltage applied via thin film transistor 83 and a counter electrode node. Counter electrode node receives a counter electrode voltage Vcnt.

Voltage holding capacitance element 82 is formed of a channel capacitance element utilizing a thin film transistor. When pixel electrode node 81 holds the voltage at H level, a channel is formed, and capacitance element 82 functions as a capacitance. When pixel electrode node 81 holds a voltage at the L level, a channel is not formed, and voltage holding capacitance element 82 functions as a capacitance having a capacitance value of the parasitic capacitance. When a boost signal BS is supplied, voltage holding capacitance element 82 supplies a significant amount of charges to pixel electrode node 81 through a charge pump operation to compensate for lowering of the voltage level due to a leakage current only when it holds the voltage at H level.

Figure 17:
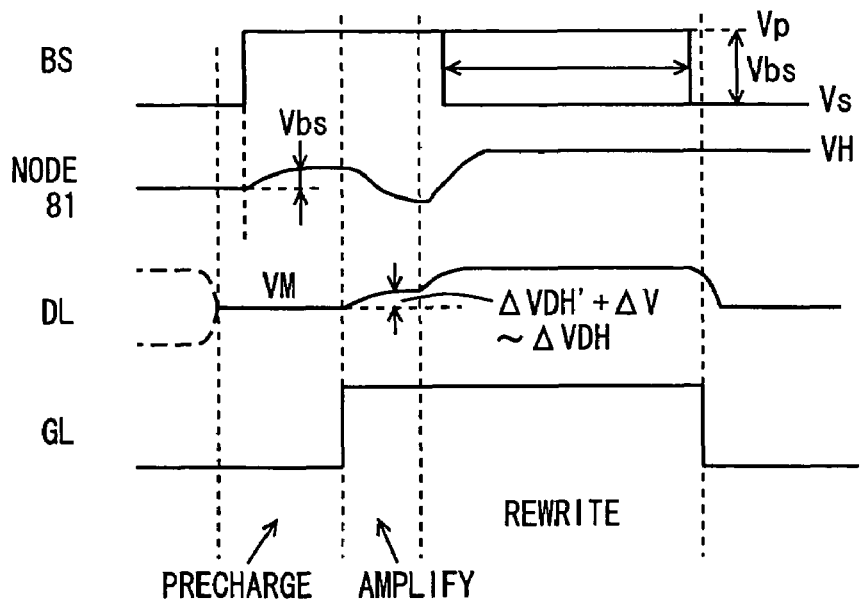
FIG. 17 is a signal waveform diagram representing an operation of a displaying pixel element shown in FIG. 16 in data reading.

FIG. 17 is a signal waveform diagram illustrating an operation of the pixel in the refresh operation of the display device shown in FIG. 16. FIG. 17 illustrates operation waveforms in the case when pixel electrode node 81 stores H-level data, and the voltage level lowers due to the leakage current. Referring to FIG. 17, description will now be given of the operation of refreshing the image data signal of the pixel shown in FIG. 16.

First, data line DL is precharged to the level of intermediate voltage level VM via a switching element included in amplifier circuit AMP. During this precharging operation period, boob signal BS at the level of voltage Vs is boosted to the level of voltage Vp. An amplitude Vbs of boost signal BS is determined depending on the amount of charges supplied to pixel electrode node 81 and the capacitance value of capacitance element 82. The voltage level of voltage Vs is also determined appropriately depending on the level of the voltage held on pixel electrode node 81.

In accordance with boost signal BS, node 81 rises in voltage level through the charge pump operation of capacitance element 82. If capacitance element 82 has an ideal coupling coefficient equal to unity, the voltage on pixel electrode node 81 changes by voltage Vbs as illustrated in FIG. 17. This change amount of the voltage on pixel electrode node 81 is determined by the amplitude of boost signal BS, capacitance Cs of capacitance element 82, the capacitance value of the parasitic capacitance of pixel electrode node 81 and the coupling coefficient of the capacitance element 82.

After the precharge operation is completed, gate line GL is driven to the selected state, to drive thin film transistor 81 into the conductive state in order for performing the amplifying operation by amplifier circuit AMP. In response to turn-on of thin film transistor 11, charges accumulated on node 81 are transmitted to corresponding data line DL. In this operation, boost signal BS maintains the level of boosted voltage Vp. On data line DL, a voltage change corresponding to the voltage on pixel electrode node 81 occurs. Thus, a voltage change, which is a sum of a voltage change $\Delta VDH'$ caused due to leakage and a voltage $\Delta V$ corresponding to voltage Vbs caused by boost signal BS, occurs on data line DL. If this voltage ($\Delta VDH'+\Delta V$) is substantially equal to voltage $\Delta VDH$, it is possible to compensate for lowering of the margin for H-level data in amplification by the differential amplifier in amplifier circuit AMP, so that the amplifying operation can be performed accurately.

Then, amplifier circuit AMP drives data line DL in accordance with the result of amplification. In the amplifying operation by amplifier circuit AMP, boost signal BS is restored to an original level of voltage Vcom. When the voltage level of boost signal BS lowers, pixel electrode node 81 is being driven by amplifier circuit AMP via data line DL so that voltage lowering due to the capacitance coupling does not occur, and pixel electrode node 81 is maintained at the original voltage level VH by amplifier circuit AMP.

When the operation of refreshing displaying pixel element PX is completed, gate line GL is driven to the unselected state, and data line DL is driven to the level of intermediate voltage VM for refreshing the held data in the next pixel row. Pixel electrode node 81 maintains the refreshed level of voltage VH.

The voltage on pixel electrode node 81 changes by a voltage level equal to the amplitude Vbs of boost signal BS if capacitance element 82 has a coupling coefficient equal to unity. Therefore, charges of Vbs·Cs are injected into pixel electrode node 81 by the charge pump operation of capacitance element 82. In reading the pixel data, parasitic capacitance 27 of data line DL and capacitance element 82 share the charges Vbs·Cs. Therefore, an incremental change $\Delta V$ of the voltage on data line DL can be expressed by the following expression:

$$\Delta V = Vbs \cdot Cs / (Cs + Cd)$$

By setting the amplitude of boost signal BS to an appropriate value, it is possible to compensate for voltage lowering of pixel electrode node 81 due to the leakage current, and to compensate for lowering of read voltage $\Delta VDH$. Specifically, when the read voltage on data line DL assumes a voltage $\Delta VDH'$ due to the voltage lowering of pixel electrode node 81, the voltage level of data line DL is raised, through the charge pump operation by boost signal BS, by $\Delta V$ to be restored to the voltage level of read data $\Delta VDH$, which is usually attained when no leakage occurs.

In the arrangement of using boost signal BS, boost signal BS is driven even when pixel electrode node 81 holds the L-level data. However, capacitance element 82 is formed of a channel capacitance element, and the capacitance value thereof contains only the capacitance value of parasitic capacitance when L-level image signal is stored. Even when the charge pump operation is performed in accordance with boost signal BS, the amount of injected charges is very small, and it is possible to suppress sufficiently the rising of voltage level of pixel electrode node 81.

Figure 18:
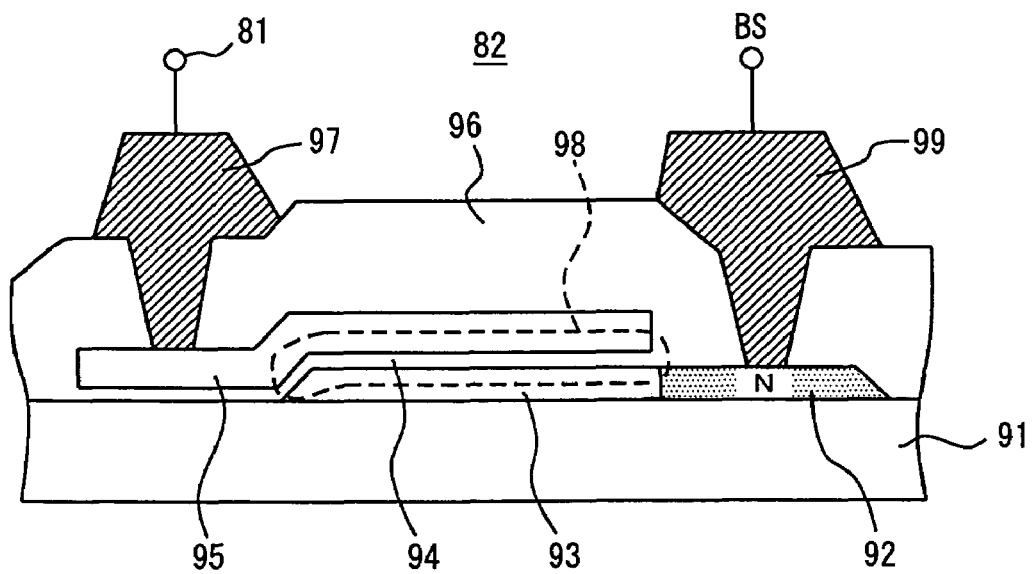
FIG. 18 schematically shows a sectional structure of a capacitance element shown in FIG. 16.

FIG. 18 schematically shows a sectional structure of voltage holding capacitance element 82 shown in FIG. 16. In FIG. 18, voltage holding capacitance element 82 has a structure similar to that of an N-channel thin film transistor, and is formed on a glass substrate 91. Capacitance element 82 includes an N-type polycrystalline silicon film 92 formed on glass substrate 91, an intrinsic polycrystalline silicon film 93 formed adjacently to N-type polycrystalline silicon film 92 on the surface of glass substrate 91, a gate insulating film 94 formed on intrinsic polycrystalline silicon film 93, a gate electrode 95 formed on gate insulating film 94 facing to intrinsic polycrystalline silicon film 93, an electrode 97 electrically connected to gate electrode 95, and an electrode 99 electrically connected to N-type polycrystalline silicon film 92.

Gate insulating film 94 is made of, e.g., silicon dioxide, and gate electrode 95 is made of, e.g., chrome. Electrodes 97 and 99 are made of, e.g., aluminum.

N-type polycrystalline silicon film 92 is electrically connected to intrinsic polycrystalline silicon film 93 when a channel is formed.

Electrode 97 is connected to pixel electrode node 81, and electrode 99 receives boost signal BS.

Capacitance element 82 has an overlap portion 98 formed between gate electrode 95 and intrinsic polycrystalline silicon film 93. A capacitance of a structure formed of gate electrode 95, intrinsic polycrystalline silicon film 93 and N-type polycrystalline silicon film 94 shown in FIG. 18, is a so-called "channel capacitance". On the basis of the voltage on electrode 99, a voltage larger than the threshold voltage of the N-channel thin film transistor is applied between electrode 97 corresponding to the gate electrode and electrode 99 corresponding to the source electrode. Responsively, an N-channel layer is formed in overlap portion 98 at the surface of intrinsic polycrystalline silicon film 93 beneath gate electrode 95, and an electrostatic capacitance is formed, with gate electrode 95 on the channel formed in overlap portion 98 being one electrode, and also with the channel layer electrically connected to N-type polycrystalline silicon film 92 being the other electrode. When pixel electrode node 81 holds the H-level data, the channel is formed in overlap portion 98, and capacitance element 82 functions as a capacitance of capacitance value Cs.

When pixel electrode node 81 holds L-level data, a voltage between electrodes 97 and 99 is smaller than the threshold voltage of the N-type thin film transistor, and the channel capacitance is not formed. In this state, capacitance element 82 has only a minute parasitic capacitance present in overlap portion 98, as its capacitance component. In this case, therefore, even if the voltage level of boost signal BS applied to electrode 99 rises, the charge pump operation is performed through the parasitic capacitance existing in overlap portion 98, and only a very small amount of charges are injected into pixel electrode node 81. Therefore, rising of the voltage on pixel electrode node 81 can be substantially suppressed while the L-data data is held.

Thereby, it is possible to read the pixel data accurately onto data line DL while compensating for lowering of the voltage level of the H-level data, and the level of voltage Vs corresponding to the L level of boost signal BS need only be appropriately determined in accordance with voltage level VH of the H-level data held on pixel electrode node 81, and may be the ground voltage or common electrode voltage Vcom. It is merely required to determine the voltage level of the boost signal BS at the L level such that a channel capacitance is formed in capacitance element 82 when pixel electrode node 81 stores H-level data, and the channel layer is not formed in the channel capacitance element in the case of storage of the L-level data.

Figure 19:
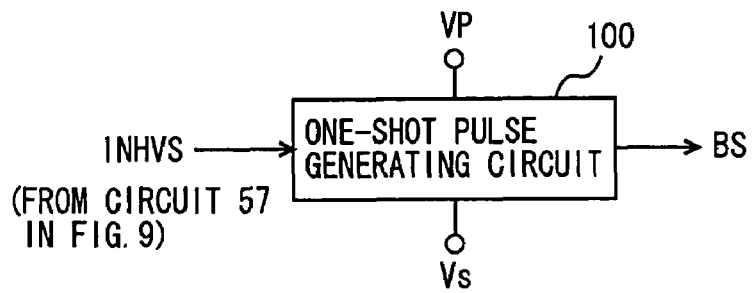
FIG. 19 schematically shows a structure of a portion for generating a boosted signal shown in FIG. 16.

FIG. 19 schematically shows a structure of a portion for generating boost signal BS shown in FIG. 16. In FIG. 19, a boost signal generating portion is formed of a one-shot pulse generating circuit 100 generating a one-shot pulse signal in response to the rising of refresh multi-selection inhibiting signal INHVS applied from one-shot pulse generating circuit 57. One-shot pulse generating circuit 100 receives the voltages Vp and Vs as operation power supply voltages. The one-shot pulse signal outputted from one-shot pulse generating circuit 100 is used as boost signal BS.

Figure 20:
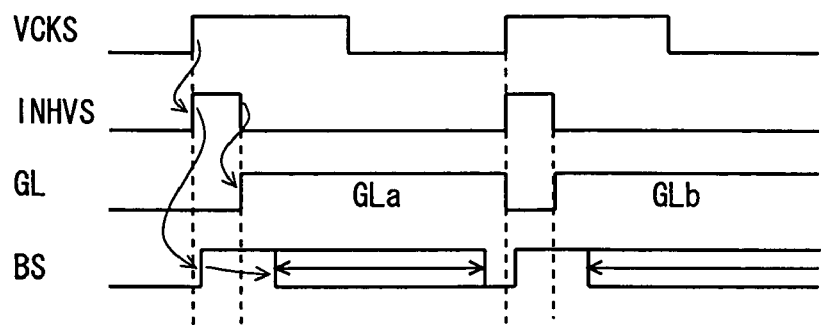
FIG. 20 is a signal waveform diagram illustrating an operation of the circuitry shown in FIG. 19.

FIG. 20 is a timing chart illustrating an operation of one-shot pulse generating circuit 100 shown in FIG. 19. Referring to FIG. 20, an operation of one-shot pulse generating circuit 100 shown in FIG. 19 will now be described briefly.

As shown in FIG. 9 previously, refresh multi-selection inhibiting signal INHVS is made H-level for a predetermined period in synchronization with the rising of vertical scan clock signal VCKS (VCK). More strictly, refresh multi-selection inhibiting signal INHVS is produced in accordance with output signal $\phi$VS0 of oscillation circuit 55 as shown in FIG. 9. In response to the rising of refresh multi-selection inhibiting signal INHVS, one-shot pulse generating circuit 100 produces a pulse signal of one shot, and responsively, poop signal BS rises to the H level. When boost signal BS rises to the H level, gate line GL is still in an unselected state as illustrated in FIG. 20, and the precharge operation is effected on the data line.

When refresh multi-selection inhibiting signal INHVS falls to the L level, a selected gate line GL (GLa) is driven to the H level. After selected gate line GLa rises to the H level and the output signal of the corresponding amplifier circuit is transmitted to the pixel electrode node, boost signal BS falls to the L level. Therefore, boost signal BS can be driven to the L level at a given point in a period, for which the selected gate line GL is at the H level.

When the operation of refreshing selected gate line GL (GLa) is completed, the refresh operation for the next row (gate line) is executed in response to vertical scan clock signal VCKS. In this case, next gate line GLb attains the H level after refresh multi-selection inhibiting signal INHVS falls to the H level. For gate line GLb, therefore, boost signal BS is made H-level for a predetermined period.

Boost signal BS may be commonly applied to the respective pixels of the display pixel matrix. In an unselected pixel, the voltage holding capacitance element performs the charge pump operation when the corresponding gate line is not selected. In this case, charges are injected into the pixel electrode node (voltage holding node), and are then extracted out in response to the falling of boost signal BS. In the displaying pixel element connected to the unselected gate line, therefore, the voltage level of the voltage holding node (pixel electrode node) does not change when one refresh operation cycle is completed.

The voltage level of boost signal BS may be controlled in units of pixel rows. Based on the output signal of the vertical shift register in the vertical scanning circuit (see FIG. 5), boost signal BS is transmitted only to a selected gate line. According to such configuration, the driving load of boost signal BS can be reduced to reduce the power consumption.

According to the third embodiment of the invention, as described above, the channel capacitance is used as the voltage holding capacitance element in the displaying pixel element, and the charge pump operation is performed when the voltage holding node holds the H-level signal. Therefore, even when the voltage level of the H-level data lowers due to a leakage current, such lowering can be reliably compensate for. In the refresh mode, a sufficient read voltage can be read onto the data line, and the amplifying operation can be performed accurately for rewriting the pixel data.

[Fourth Embodiment]

Figure 21:
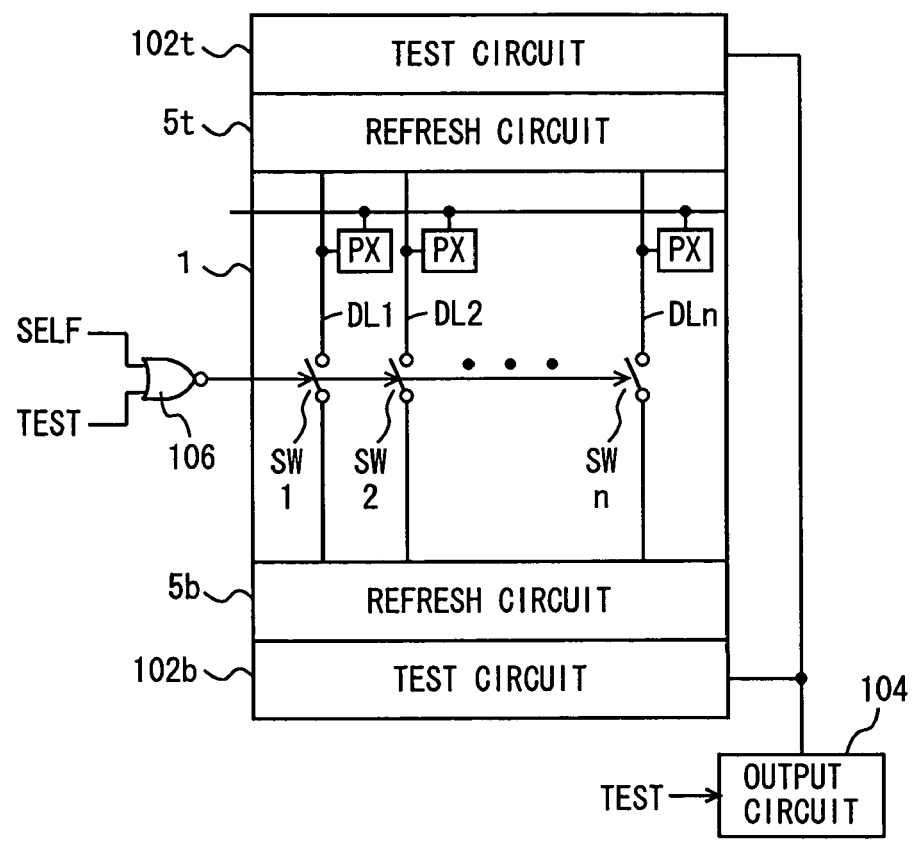
FIG. 21 schematically shows a structure of a display device according to a third embodiment of the invention.

FIG. 21 schematically shows a structure of a main portion of a display device according to a fourth embodiment of the invention.

Referring to FIG. 21, display pixel matrix 1 includes displaying pixel elements PX arranged in rows and columns. FIG. 21 representatively shows displaying pixel elements PX arranged in one row. Data lines DL1, DL2, . . . DLn are arranged corresponding to the respective columns of displaying pixel elements PX.

Data lines DL1–DLn are provided at middle portions thereof with switching gates SW1, SW2, . . . and SWn. These switching gates SW1–SWn are commonly supplied with an output signal of a NOR circuit 106 receiving refresh mode instructing signal SELF and test mode instructing signal TEST. In the refresh mode and the test mode, therefore, switching gates SW1–SWn are made non-conductive to bi-divide corresponding data lines DL1, DL2, . . . and DLn.

Refresh circuits 5t and 5b are arranged on the opposite sides, in the column direction, of display pixel matrix 1. Refresh circuits 5t and 5b each include amplifier circuits (see FIG. 2) provided corresponding to data lines DL1–DLn. Test circuits 102t and 102b are arranged adjacently to refresh circuits 5t and 5b, for reading data amplified by the amplifier circuits in refresh circuits 5t and 5b. Test circuits 102t and 102b are commonly coupled to output circuit 104. When test mode instructing signal TEST is active, output circuit 104 externally outputs the data received from test circuits 102t and 102b.

Figure 22:
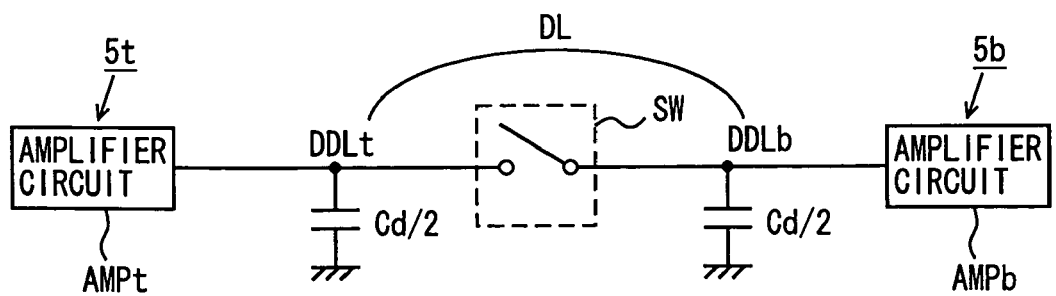
FIG. 22 shows a structure of a main portion of the display device shown in FIG. 21.

As shown in FIG. 22, switching gate SW bi-divides data line DL into divided data lines DDLt and DDLb in the refresh mode and the test operation mode. Divided data line DDLt is coupled to amplifier circuit AMPt included in refresh circuit 5t, and divided data line DDLb is coupled to amplifier circuit AMPb included in refresh circuit 5b. Assuming that each of data lines DL1–DLn has the parasitic capacitance of the capacitance value of Cd, each of divided data lines DDLt and DDLb has a parasitic capacitance of Cd/2. In the case where the voltage holding capacitance included in displaying pixel element PX has the capacitance value of Cs, therefore, voltages ΔVDH and ΔVDL placed on divided data lines DDLt and DDLb are expressed by the following equations, respectively:

$$\Delta VDH=(VH-VL)\cdot Cs/2\cdot(Cs+Cd/2),$$

$$\Delta VDL=(-VH+3\cdot VL)\cdot Cs/2\cdot(Cs+Cd/2)$$

The capacitance value of the data line is decreased from Cd to Cd/2, and read voltages ΔVDH and ΔVDL appearing on divided data lines DDLt and DDLb can be increased nearly to doubled values. Thereby, even when the voltage held by the displaying pixel element is low, amplifier circuits AMPt and AMPb can accurately perform the amplifying operation for refreshing the display pixel data and for external reading out.

Figure 23:
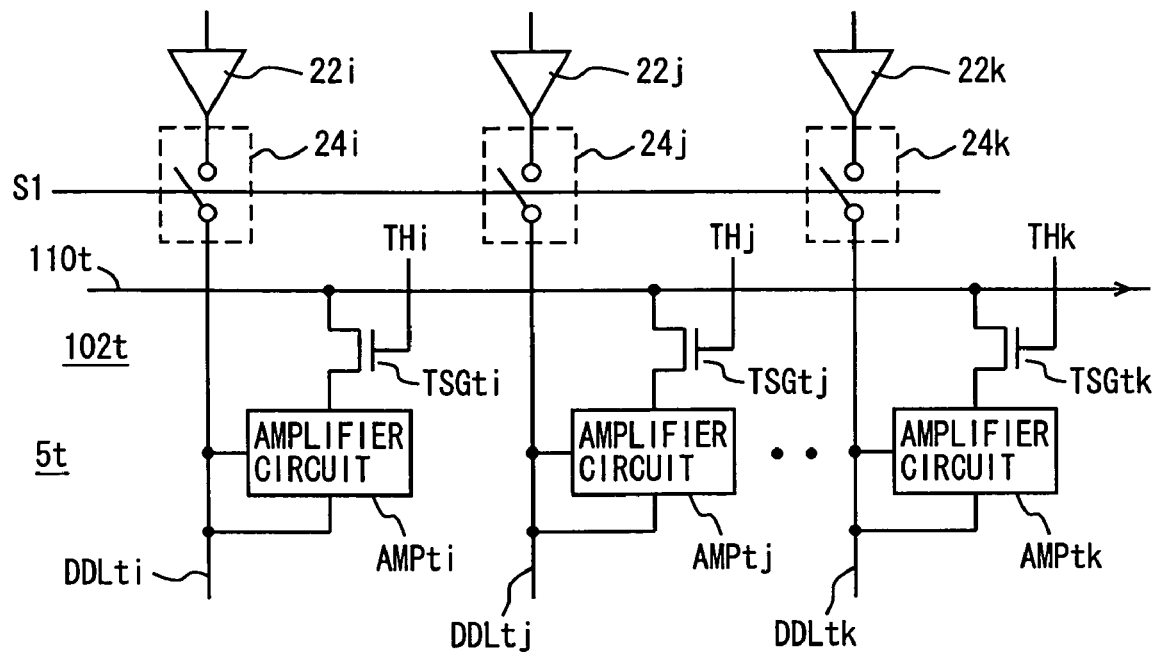
FIG. 23 shows, by way of example, structures of a refresh circuit and a test circuit shown in FIG. 21.

FIG. 23 schematically shows structures of refresh circuit 5t and test circuit 102t shown in FIG. 21. In FIG. 23, divided data lines DDLti, DDLtj and DDLtk are respectively coupled to gate line drivers 22i, 22j and 22k via isolation gates 24i, 24j and 24k selectively made conductive in response to connection control signal S1. These gate line drivers 22i, 22j and 22k as well as isolation gates 24i, 24j and 24k have the same structures as those shown in FIG. 2.

Refresh circuit 5t includes amplifier circuits AMPti, AMPtj and AMPtk provided corresponding to divided data lines DDLti, DDLtj and DDLtk, respectively. Amplifier circuits AMPti, AMPtj and AMPtk have the same structure as the amplifier circuit AMPi shown in FIG. 2.

Test circuit 102t includes test select gates TSGti, TSGtj and TSGtk provided corresponding to amplifier circuits AMPti, AMPtj and AMPtk, respectively. In the test operation, test select gates TSGti, TSGtj and TSGtk are made conductive in response to test horizontal scan signals THi, THj and THk made sequentially active, to transmit the output signals of corresponding amplifier circuits AMPti, AMPtj and AMPtk to a common test data line 110, respectively. This test common data line 110 is coupled to output circuit 104 shown in FIG. 21. The common test data line 110 may be provided with a main amplifier, through which the test data is transferred to output circuit 104.

Refresh circuit 5b and test circuit 102b shown in FIG. 21 have the structures similar to those of refresh circuit 5t and test circuit 102t shown in FIG. 23. Therefore, refresh circuits 5t and 5b can have individually the amplifier circuits activated for refreshing the pixel data. Refresh circuits 5t and 5b may be concurrently activated for amplifying the image data signals, and may alternatively be activated to perform the amplification in accordance with the position of a selected gate line.

Figure 24:
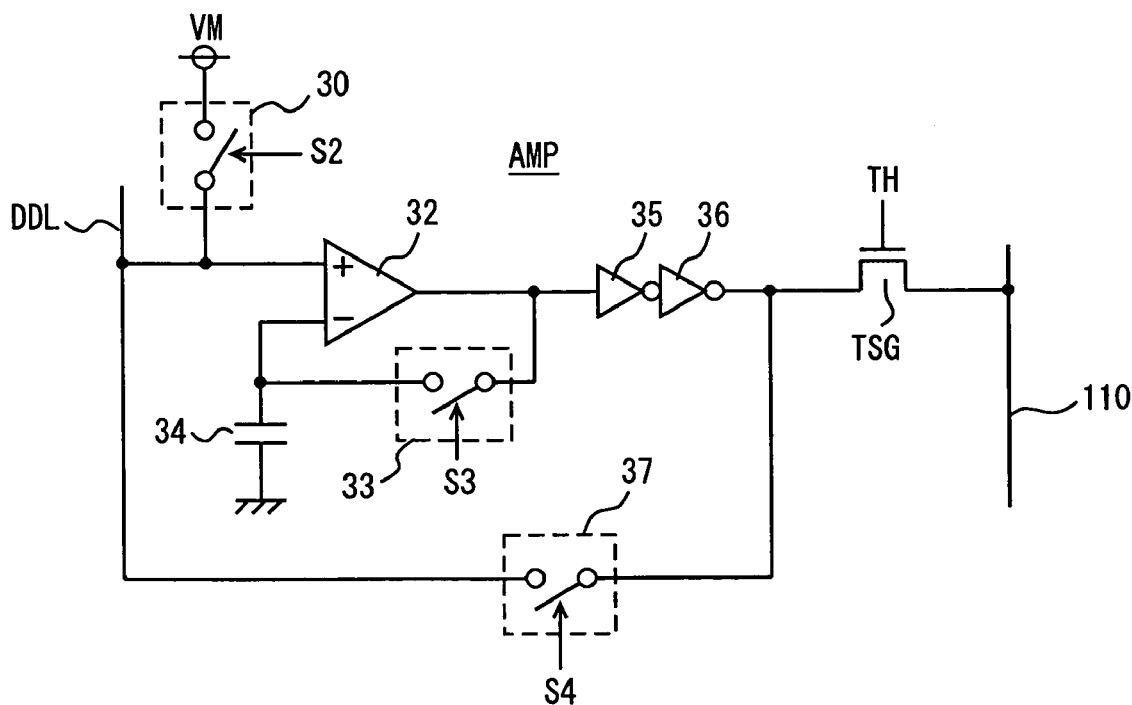
FIG. 24 specifically shows connection between an amplifier circuit and a test select gate shown in FIG. 23.

FIG. 24 shows more specifically the structures of refresh circuits 5t and 5b as well as test circuits 102t and 102b shown in FIG. 21. These refresh circuits t5 and 5b have the same structure, and test circuits 102t and 102b also have the same structure. Therefore, FIG. 24 representatively shows amplifier circuit AMP and a test select gate TSG in the refresh circuit provided for one divided data lines DDL.

Similarly to the structure shown in FIG. 2, amplifier circuit AMP has switching gates 30, 33 and 37, capacitance element 34, differential amplifier circuit 32 differentially amplifying a charged voltage of capacitance element 34 and a signal on divided data line DDL, and two stages of cascaded inverter buffers 35 and 36 for producing a signal of a large drive power by amplifying the output signal of differential amplifier circuit 32.

In the test circuit, test select gate TSG transfers the output signal of inverter buffer 36 to common test data line 110. Test select gate TSG receives a test horizontal scan signal TH.

As shown in FIG. 24, amplifier circuit AMP amplifies a minute accumulated voltage of the displaying pixel element, and transfers a resultant signal via read data line 110 to output circuit 104 shown in FIG. 21. Thereby, binary data can be read out externally through amplification of the minute pixel voltage. In the outside, an array tester for detecting a minute signal is not required, but an inexpensive LSI tester can be used. In accordance with test horizontal scan signal TH, the pixel data for one row can be sequentially and successively read out to determine the logical levels of the binary pixel data. Thus, it is not necessary to determine the logical level of the minute voltage level, and the test time can be reduced.

Test select gate TSG may be formed of a tristate buffer, or of a CMOS transmission gate.

For the structure for producing switch control signals S2–S4 and connection control signal S1 in the test mode, the structure shown in FIG. 11 can be used. Output signal φVS0 of the oscillation circuit is produced when test mode instructing signal TEST is active. For other control signals, the configuration similar to that shown in FIG. 9 can be utilized. Amplifier circuit AMP can perform the accurate amplifying operation while canceling the offset even in the test mode, and the stored pixel data in a pixel element can be read externally.

Figure 25:
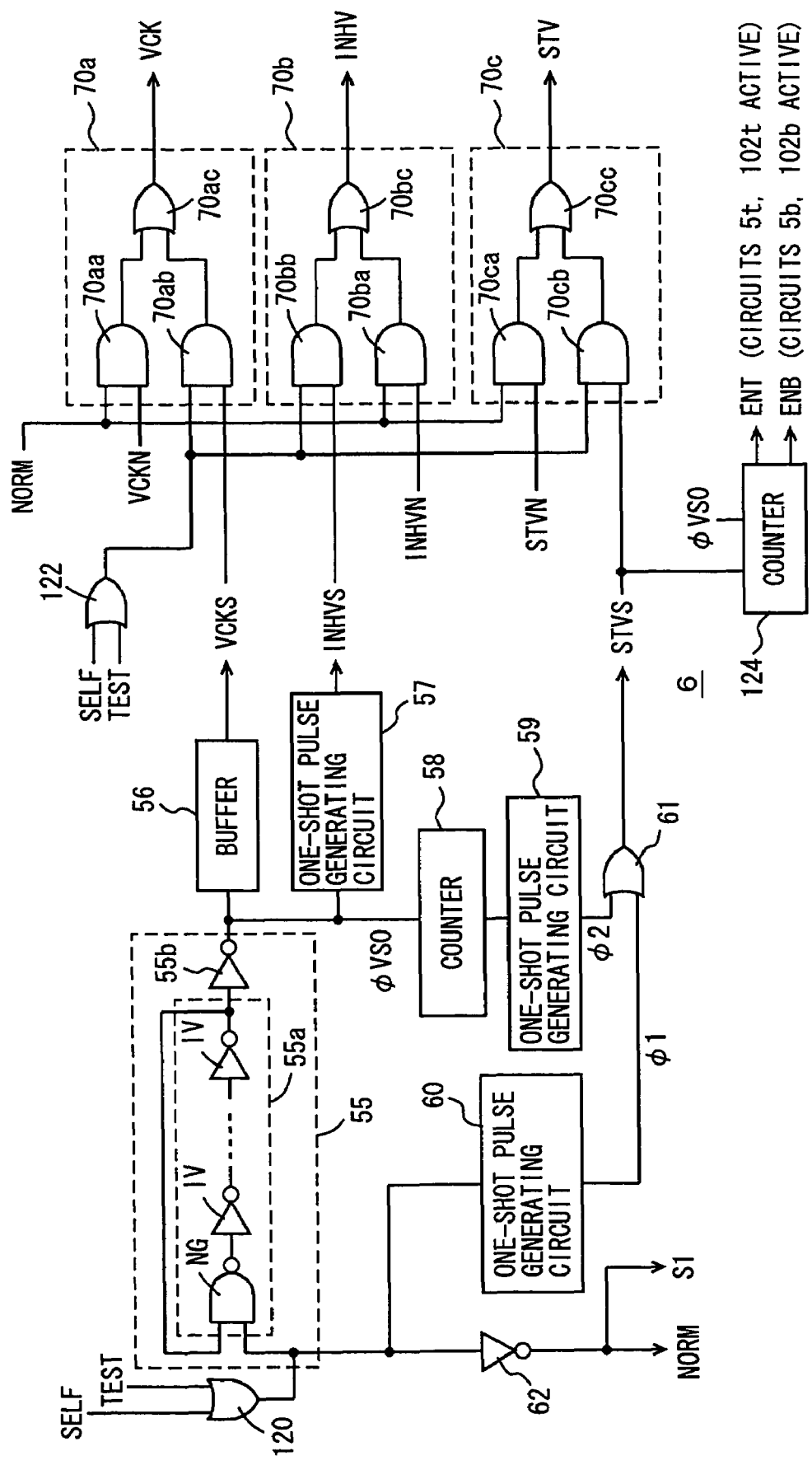
FIG. 25 schematically shows a structure of a portion for generating control signals shown in FIG. 24.

FIG. 25 schematically shows a structure of a portion for producing signals related to the gate line selection of the display device according to the fourth embodiment of the invention. The structure of the control signal generating portion shown in FIG. 25 differs in the structure from the control signal generating portion shown in FIG. 9 in the following points. Oscillation circuit 55 receives, instead of refresh mode instructing signal SELF, an output signal of an OR circuit 120 receiving refresh mode instructing signal SELF and test mode instructing signal TEST. The output signal of OR circuit 120 is also applied to one-shot pulse generating circuit 60 and inverter 62.

Select circuits 70a–70c are supplied with an output signal of an OR circuit 122 receiving refresh mode instructing signal SELF and test mode instructing signal TEST, instead of the refresh mode instructing signal.

For accommodating with the bi-divided structure of the display pixel matrix, there is provided a counter 124 that has a count reset in accordance with refresh vertical scan start signal STVS, and counts output signal $\phi$VS0 of oscillation circuit 55. In accordance with the count value, counter 124 generates an activating signal ENT activating refresh circuit 5t and test circuit 102t, and an activating signal ENB activating refresh circuit 5b and test circuit 102b.

The other structure of the control signal generating portion shown in FIG. 25 is the same as that of the control signal generating portion shown in FIG. 9. The corresponding portions are allotted with the same reference numbers, and description thereof will not be repeated.

Figure 26:
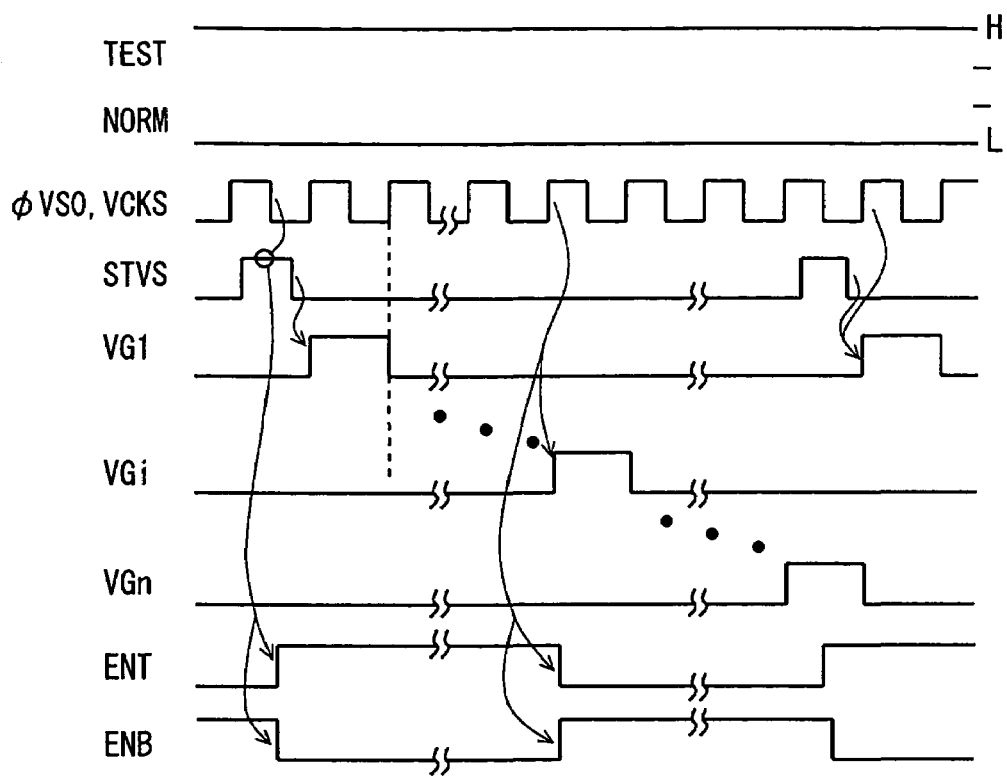
FIG. 26 is a timing chart illustrating an operation of the circuitry shown in FIG. 25.

FIG. 26 is a timing chart illustrating an operation of counter 124 in the control signal generating portion shown in FIG. 25. An operation of counter 124 will now be described with reference to FIG. 26.

In the test mode, test mode instructing signal TEST is at the H level, and accordingly the normal operation mode instructing signal NORM is at the L level. In accordance with output signal $\phi$VS0 of oscillation circuit 55, buffer circuit 56 outputs a refresh vertical scan clock signal VCKF at predetermined cycles. When refresh vertical scan start signal STVS outputted from OR circuit 61 is made active, counter 124 sets its count to the initial value, and activates the activating signal ENT. Thereby, a test is performed of the divided data lines (DDLt) in an upper region of display pixel matrix 1 shown in FIG. 21. Thus, the gate line drive signals starting from signal VG1 are sequentially driven to the selected state, and the amplification and reading of the pixel data are sequentially executed.

After all the gate lines crossing divided data line DDLt are driven in the display pixel matrix, the gate lines crossing divided data line DDLb are sequentially selected. For selecting first gate line VGi, counter 124 sets activating signal ENT and ENB to L- and H-levels in accordance with its count value, respectively. Activating signals ENT and ENB are activated in synchronization with output signal $\phi$VS0 of oscillation circuit 55.

Thereby, refresh circuit 5b and test circuit 102b shown in FIG. 21 are activated, and a test is performed on the pixels connected to the gate lines crossing divided data lines DDLb in the lower region.

By counting the number of the selected data lines, associated refresh circuit and test circuit can be activated in accordance with the position of the selected gate line even in the bi-divided display pixel matrix structure. In bi-divided display pixel matrix structure, the gate lines may be selected in accordance with the interlace system. Even in this case, through setting of a count-up value of counter 124 to an appropriate value (half the number of gate lines in one field), the refresh circuit and the test circuit in the upper region as well as the refresh circuit and the test circuit in the lower region can be accurately and selectively activated in accordance with the position of a selected gate line.

Such a configuration may be employed, in which in the test mode, the pixel data are read in parallel onto divided data lines DDLt and DDLb of the display pixel matrix, and both refresh circuits 5t and 5b shown in FIG. 21 perform the amplifying operation. In the test mode, vertical scan start signal STVS is set to the head position in each divided region of vertical shift register 40 shown in FIG. 5. Thereby, the gate lines in the respective divided regions can be simultaneously selected for the divided data lines DDLt and DDLb to amplify and read the display pixel data. This parallel amplifying operation of the display pixel data may be executed in the refresh mode.

Figure 27:
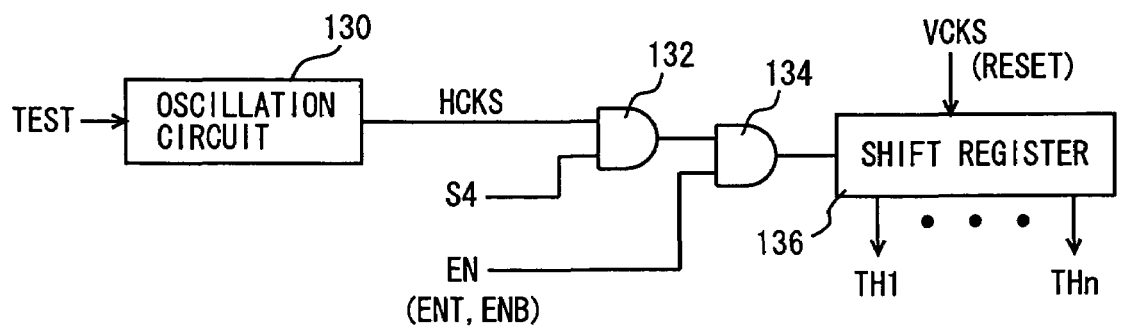
FIG. 27 schematically shows a structure of a portion for generating test select control signals shown in FIG. 23.

FIG. 27 schematically shows a structure of a portion for generating test horizontal scanning signals TH (THi and others) shown in FIG. 23. In FIG. 27, the test horizontal scan signal generating section includes an oscillation circuit 130 that is activated in response to activation of test mode instructing signal TEST, to perform the oscillating operation at a predetermined cycle to provide the oscillating signal as a test horizontal clock signal HCKS, an AND gate 132 receiving oscillation signal HCKS and switch control signal S4 shown in FIG. 2, an AND gate 134 receiving the output signal of AND gate 132 and activating signal EN (ENT or ENB) received from counter 124 shown in FIG. 25, and a shift register 136 performing the shift operation in accordance with the output signal of AND gate 134 to produce test horizontal scanning signals TH1–THn. The shift register 136 is reset in response to the activation of vertical scan clock signal VCKS. Shift register 136 may be reset in response to vertical scan start signal STV.

The test horizontal scan signal generating portion shown in FIG. 27 is provided for each of test circuits 102t and 102b shown in FIG. 21. Therefore, activating signal EN is the activating signal ENT when the test select signal generating section shown in FIG. 27 is provided for test circuit 102t, and is activating signal ENB when the test select signal generating section in FIG. 27 is provided for test circuit 102b.

Figure 28:
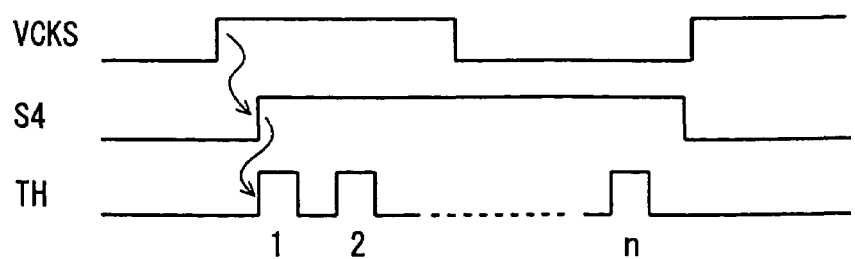
FIG. 28 is a timing chart illustrating an operation of the circuitry shown in FIG. 2.

FIG. 28 is a timing chart illustrating an operation of the test select signal generating section shown in FIG. 27. Referring to the timing chart shown in FIG. 28, description will now be given on the operation of the circuitry shown in FIG. 27.

In the normal operation mode and the refresh mode, a test mode instructing signal TST is inactive, and oscillation signal HCKS generated from oscillation circuit 130 is fixed at the L level. In this case, therefore, even when activating signal EN is made active in the refresh mode, AND gate 134 generates the output signal at the L level, and shift register 136 does not perform the shift operation.

In the test operation mode, test mode instructing signal TEST is made active, and oscillation circuit 130 performs the oscillating operation at a predetermined cycle. When vertical scan clock signal VCKS is made active and one of the gate lines is driven to the selected state, switch control signal S4 is driven to the active state after the amplifying operation of the amplifier circuit in the refresh circuit. In response to the activation of switch control signal S4, AND gate 132 passes oscillation signal HCKS applied from oscillator circuit 130 therethrough.

Shift register 136 is reset to select the head position in response to the activation of vertical scan clock signal VCKS. Therefore, shift register 136 drives first test horizontal scan signal TH1 to the active state in response to the activation of switch control signal S4. Thereafter, shift register 136 performs the shift operation in accordance with oscillation signal HCKS of oscillation circuit 130 to drive sequentially test horizontal scan signals TH1–THn starting at the signal TH1 to the selected state.

After shift register 136 drives the last test select signal THn to the selected state, it maintains all test select signals TH1–THn in the inactive state. When vertical scan clock signal VCKS is activated for the driving of the next gate line, shift register 136 is reset again, and the shift operation for the test select signals starting from test select signal TH1 is executed.

If shift register 136 is provided commonly to test circuits 102t and 102b, a combined signal (logical AND signal) of each of test horizontal scan signals TH1–THn applied from shift register 136 and activating signal EN (ENT or ENB) is used for the test horizontal scan signals.

If the horizontal scan register used in the normal operation mode is utilized as shift register 136, the horizontal shift register is similarly activated to perform the shift operation in accordance with test mode instructing signal TEST and switching control signal S4. By using activating signals ENT and ENB, test horizontal scan signals for test circuits 102t and 102b are generated.

In the structure shown in FIG. 21, the display pixel matrix is bi-divided by switching elements SW1–SWn. However, even when the refresh circuit and the test circuit are arranged on one side of the display pixel matrix, the test of the displaying pixel elements can likewise be performed by using the refresh circuit. In the structures shown in FIGS. 25 and 27, it is merely required to produce the test control signals for one test circuit.

According to the fourth embodiment of the invention, as described above, the display pixel matrix has the bi-divided structure, and the refresh circuits are provided for the divided data lines so that the parasitic capacitances of the divided data lines can be reduced, and large voltages can be read from the displaying pixel elements. Therefore, the data of displaying pixel elements can be accurately amplified and rewritten.

By using the result of amplification of the refresh circuit, the test circuit reads out externally the amplified data of the displaying pixel elements. It is not necessary to detect a minute signal by a tester, and the display pixel data of a large amplitude can be read out externally so that the test can be performed fast with an inexpensive tester.

[Fifth Embodiment]

Figure 29:
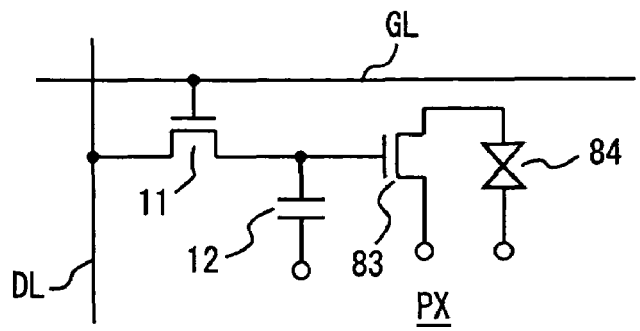
FIG. 29 shows another structure of a displaying pixel element.

FIG. 29 schematically shows another structure of displaying pixel element PX. Displaying pixel element PX shown in FIG. 29 includes an N-channel thin film transistor 83 transmitting a common pixel drive voltage to liquid crystal display element 84 in accordance with the held voltage of capacitance element 12. The other electrode of the liquid crystal display element is a counter electrode. N-channel thin film transistor 11 couples capacitance element 12 to data line DL in accordance with the signal potential of gate line GL.

Even if liquid crystal display element 80 is driven by thin film transistor 83 as shown in FIG. 29, the refreshing and reading for external output of the held voltage of capacitance element 12 can be accurately performed similarly.

Figure 30:
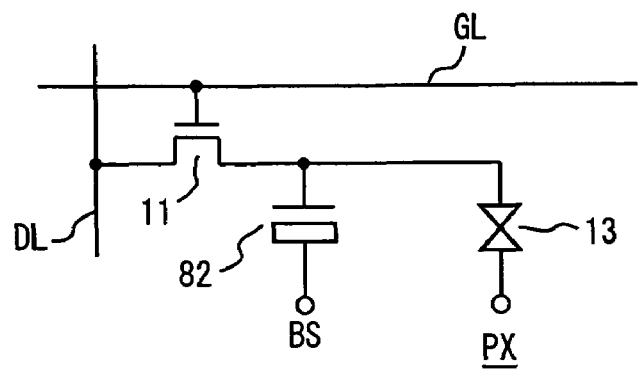
FIG. 30 shows still another structure of the displaying pixel element.

FIG. 30 shows still another structure of displaying pixel element PX. In displaying pixel element PX shown in FIG. 30, liquid crystal display element 13 is driven in accordance with the held voltage of capacitance element 82 formed of a channel capacitance. Boost signal BS applied to capacitance element 82 can compensate for the voltage lowering of the H level data held on the pixel electrode node due to the leakage current so that the read voltage read onto data line DL can be made sufficiently large. Therefore, even in the case where gate line GL is selected, and thin film transistor 11 is made conductive to read the held voltage of capacitance element 82 onto data line DL for refreshing, the held voltage can be accurately refreshed. Also, in the operation of reading the held voltage of capacitance element 82 for external output, the held voltage can be accurately amplified by the amplifier circuit to be outputted externally.

Figure 31:
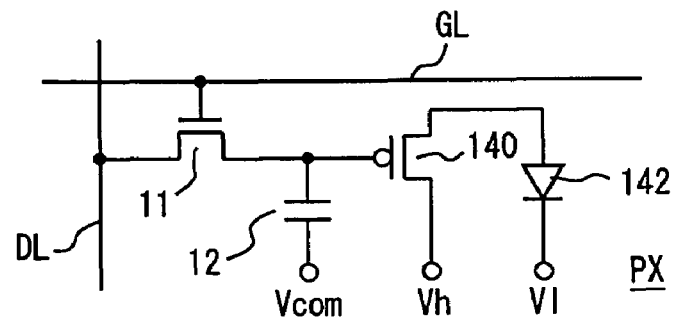
FIG. 31 shows a further structure of the displaying pixel element.

FIG. 31 shows yet another structure of displaying pixel element PX. Displaying pixel element PX shown in FIG. 31 includes an electroluminescent light emitting element 142. Electroluminescent light emitting element 142 is driven by a P-channel thin film transistor 140, which in turn is selectively rendered conductive in accordance with the held voltage of capacitance element 12. When thin film transistor 140 is made conductive, electroluminescent light emitting element 142 receives a high-level power supply voltage Vh on its anode electrode. Electroluminescent light emitting element 142 receives low-level power supply voltage Vl on its cathode electrode. These voltages Vh and Vl may be the power supply voltage and the ground voltage, respectively.

Capacitance element 12 is coupled to data line DL via N-channel thin film transistor 11 responsive to the signal potential of gate line GL. In the structure of displaying pixel element PX shown in FIG. 31, conduction and non-conduction of thin film transistor 140 are determined in accordance with the held voltage of capacitance element 12. By using the refresh circuit already described, it is therefore possible to compensate accurately for the lowering of the held voltage of capacitance element 12 due to the leakage current, to restore the held voltage to the original voltage level. By using the test circuit, it is possible to detect a failure in displaying pixel element PX.

In the structure of displaying pixel element PX shown in FIG. 31, the channel capacitance 82 shown in FIG. 30 may be employed as the capacitance element.

Accordingly, the invention can be applied to various kinds of displaying pixel elements, provided that a capacitance element is utilized for an element holding the pixel data signal voltage, and the held voltage determines the display state of the display pixel.

[Sixth Embodiment]

Figure 32:
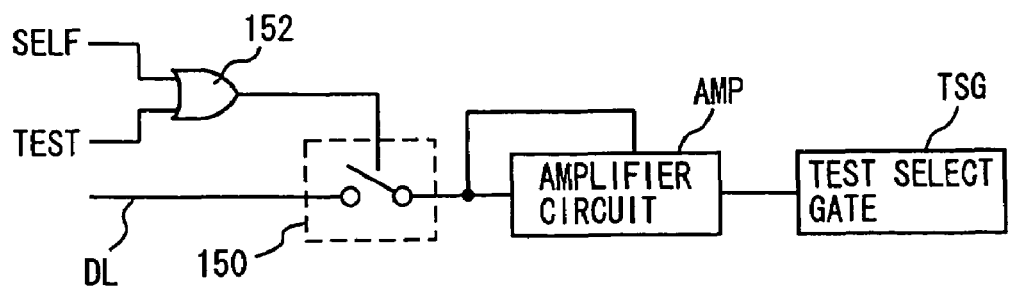
FIG. 32 schematically shows a structure of a main portion of a display device according to a fourth embodiment of the invention.

FIG. 32 schematically shows a structure of a main portion of a display device according to the sixth embodiment of the invention. In the structure shown in FIG. 32, data line DL is provided with an isolation gate 150. Amplifier circuit AMP is coupled to data line DL via isolation gate 150. Isolation gate 150 is selectively made conductive in accordance with the output signal of an OR circuit 152 receiving refresh mode instructing signal SELF and test mode instructing signal TEST. The output signal of amplifier circuit AMP is selected by test select gate TSG in the test mode, and is transferred to an output circuit (not shown).

In the normal operation mode other than the refresh mode and the test mode, isolation gate 150 maintains the non-conductive state to isolate data line DL from amplifier circuit AMP. In the test mode or the refresh mode, isolation gate 150 is made conductive to couple data line DL to amplifier circuit AMP. Therefore, it is possible to reduce the load on data line DL in the normal operation mode, and the data line driver can rapidly drive data line DL in accordance with the write image data signal.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

This invention can be generally applied to a circuit for driving a display panel of a display device.

Devices, which utilizes the liquid crystal panel, include display devices of stand-alone personal computers and display devices of portable devices. Such portable devices include laptop computers, portable phones, PDAs (Personal digital Assistants) and game equipments.

According to the invention, as described above, the data line is precharged to a predetermined potential, and the differential amplifier circuit is configured to operate as a voltage follower to set the comparison reference voltage level. Therefore, even when variation in threshold voltage of the differential amplifier circuit causes the offset, the image information read from a displaying pixel element can be accurately amplified. Thus, refreshing of the accumulated voltage of the displaying pixel element and reading of the accumulated voltage of the displaying pixel element for external output can be performed.

The invention claimed is:

1. An image display device comprising:
a plurality of displaying pixel elements arranged in rows and columns;
a plurality of gate lines, arranged corresponding to the respective display pixel rows, each connected to the displaying pixel elements on a corresponding row, for selecting the display pixels on the corresponding row when said each is selected;
a plurality of data lines, arranged corresponding to the respective display pixel columns, each connected to the displaying pixel elements in a corresponding column, for transferring pixel data to the displaying pixel elements in the corresponding column;
a peripheral control circuit responsive to an operation mode instructing signal for driving a selected gate line of said plurality of gate lines to a selected state to supply an accumulated charge of a corresponding display pixel onto a corresponding data line; and
a plurality of amplifier circuits, arranged corresponding to the respective pixel columns, each for amplifying a voltage applied onto the data line in a corresponding column when activated, each amplifier circuit including a capacitance element, a differential amplifier circuit having a first input coupled to a corresponding data line and a second input connected to said capacitance element for differentially amplifying signals on the first and second input signals when made active, a first switching element coupling said first input to a reference power supply supplying a predetermined voltage in response to a first switch control signal, and a second switching element coupling an output of said differential amplifier circuit to said capacitance element in response to a second switch control signal.

2. The image display device according to claim 1, wherein said peripheral control circuit responsive to said operation mode instructing signal for producing the first and second switch control signals to render the first and second switching elements conductive for a predetermined period, and then producing a select timing control signal for driving a selected gate line among said plurality of gate lines to a selected state.

3. The image display device according to claim 1, wherein each of said plurality of amplifier circuits further includes a data line drive circuit for transmitting an output signal of said each amplifier circuit to a corresponding data line after the selected gate line is driven to the selected state, and said data line drive circuit stops transference to the corresponding data line of the output signal of said differential amplifier circuit when the first and second switching elements are made conductive.

4. The image display device according to claim 1, wherein said first input is a non-inversion input, and said second input is an inversion input.

5. The image display device according to claim 1, wherein said differential amplifier circuit includes:
first and second field effect transistors having gates respectively connected to the first and second inputs;
a constant current circuit coupled to said first and second field effect transistors, for causing an operation current of a constant magnitude to flow through said first and second field effect transistors;
load elements arranged corresponding to said first and second field effect transistors, respectively;
an output transistor having a gate coupled to a conduction node of the first field effect transistor for producing the output signal of said differential amplifier circuit; and
a constant current supply transistor coupled to the output node of said differential amplifier circuit, for causing a flow of a current corresponding to the current supplied by said constant current circuit through said output node.

6. The image display device according to claim 1, wherein said differential amplifier circuit includes:
a differential stage formed of a pair of first and second field effect transistors having respective gates connected to the first and second inputs;
a current mirror stage coupled to said first and second field effect transistors;
an output transistor having a gate coupled to a conduction node of the first field effect transistor for producing the output signal of said differential amplifier circuit;
a constant current circuit for producing a constant current determining an operation current of said differential stage; and
a current supply transistor coupled to said output transistor for producing a current corresponding to the current supplied by said constant current circuit on the output node of said differential amplifier circuit.

7. The image display device according to claim 1, wherein the predetermined voltage supplied by said reference power supply is at a voltage level intermediate between a high level and a low level of a signal transmitted to the data lines.

8. The image display device according to claim 1, further comprising:
a circuit for maintaining the amplifier circuits inactive in a normal operation mode.

9. The image display device according to claim 1, further comprising:
a plurality of third switching elements arranged for the data lines, respectively, and made selectively non-conductive to divide corresponding data lines in a specific operation mode including a refresh mode of operation other than a normal operation mode, wherein the amplifier circuits are arranged corresponding to divided data lines, respectively.

10. The image display device according to claim 1, wherein each of the displaying pixel elements includes a capacitance element formed of a channel capacitance as a pixel data holding element.

11. The image display device according to claim 10, further comprising:

a circuit for supplying a boost signal to said capacitance element.

12. The image display device according to claim 1, further comprising:

transfer circuitry for externally transferring an output signal of the amplifier circuit in a test operation mode.

13. The image display device according to claim 12, wherein said transfer circuitry includes:

a test output circuit for externally outputting received data, and a select circuit for sequentially selecting and coupling the output signals of the amplifier circuits to said test output circuit.

* * * * *